US010009592B2

(12) United States Patent
Lee et al.

(10) Patent No.: US 10,009,592 B2
(45) Date of Patent: Jun. 26, 2018

(54) METHOD AND APPARATUS FOR PROCESSING 3-DIMENSIONAL IMAGE INCLUDING ADDITIONAL OBJECT IN SYSTEM PROVIDING MULTI-VIEW IMAGE

(71) Applicant: LG ELECTRONICS INC., Seoul (KR)

(72) Inventors: Gyoyoon Lee, Seoul (KR); Jongyeul Suh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 195 days.

(21) Appl. No.: 14/902,254

(22) PCT Filed: Jul. 1, 2014

(86) PCT No.: PCT/KR2014/005864
§ 371 (c)(1),
(2) Date: Dec. 30, 2015

(87) PCT Pub. No.: WO2015/002442
PCT Pub. Date: Jan. 8, 2015

(65) Prior Publication Data
US 2016/0373714 A1    Dec. 22, 2016

Related U.S. Application Data

(60) Provisional application No. 61/842,367, filed on Jul. 2, 2013, provisional application No. 61/847,096, filed on Jul. 17, 2013.

(51) Int. Cl.
*H04N 13/00* (2018.01)
(52) U.S. Cl.
CPC ....... *H04N 13/007* (2013.01); *H04N 13/0022* (2013.01); *H04N 2013/0081* (2013.01)

(58) Field of Classification Search
CPC ............. H04N 13/007; H04N 13/0022; H04N 13/0081
(Continued)

(56) References Cited

U.S. PATENT DOCUMENTS

2011/0242296 A1    10/2011   Ishihara et al.
2013/0250052 A1    9/2013    Suh et al.

FOREIGN PATENT DOCUMENTS

JP    2011-216937 A    10/2011
JP    2011-223126 A    11/2011
(Continued)

OTHER PUBLICATIONS

Google Translation of NPL titled "Multi-view Generation using High Resolution Stereoscopic Cameras and a Low Resolution Time-of-Flight Camera", Cheon Lee, Hyok Song.*
(Continued)

*Primary Examiner* — Nguyen Truong
(74) *Attorney, Agent, or Firm* — Birch, Stewart, Kolasch & Birch, LLP

(57) ABSTRACT

A method for processing a 3-dimensional image including an additional object in a system providing a multi-view image according to one embodiment of the present invention comprises the steps of: receiving video images and depth images from a plurality of views; configuring one additional object of additional objects displayed in the video images from the plurality of views as a reference additional object; calculating disparity between pixels of an area in which the reference additional object is displayed and a video image, which is adjacent to an edge of the reference additional object; applying a disparity value, which is larger the or equal to a value of the calculated disparity, to the reference additional object, so as to combine the reference additional object with a first view video image and a second view video (Continued)

image; and formatting the first view video image and the second view video image, with which the reference additional object has been combined, as 3-dimensional images.

12 Claims, 14 Drawing Sheets

(58) Field of Classification Search
USPC .......................................................... 348/43
See application file for complete search history.

(56) References Cited

FOREIGN PATENT DOCUMENTS

| KR | 10-2011-0107667 A | 10/2011 |
| WO | WO 2012/074328 A2 | 11/2011 |

OTHER PUBLICATIONS

KR 20110107667 Machine Translation.*
Lee et al., "Multi-view Generation using High Resolution Stereoscopic Cameras and a Low Resolution Time-of-Flight Camera," Journal of KICS, vol. 37A, No. 04, Apr. 2012, pp. 239-249, with an English abstract.

* cited by examiner $$z = \frac{1}{(depth/255)} \times \left(\frac{1}{z_{near}} - \frac{1}{z_{far}}\right) + \frac{1}{z_{far}}$$

$$dk = \left(\frac{FocalLength \times Camera\ distance}{z}\right) - point\ offset$$

(a)

(b)

$$z = \frac{1}{(depth/255)} \times \left(\frac{1}{z_{near}} - \frac{1}{z_{far}}\right) + \frac{1}{z_{far}}$$

$$dk = \left(\frac{FocalLength \times Camera\, distance}{z}\right) - point\, offset$$

METHOD AND APPARATUS FOR PROCESSING 3-DIMENSIONAL IMAGE INCLUDING ADDITIONAL OBJECT IN SYSTEM PROVIDING MULTI-VIEW IMAGE

CROSS REFERENCE TO RELATED APPLICATIONS

This application is the National Phase of PCT International Application No. PCT/KR2014/005864, filed on Jul. 1, 2014, which claims priority under 35 U.S.C. 119(e) to U.S. Provisional Application No. 61/842,367, filed on Jul. 2, 2013, and to U.S. Provisional Application No. 61/847,096, filed on Jul 17, 2013, all of which are hereby expressly incorporated by reference into the present application.

TECHNICAL FIELD

The present invention relates to a method of processing an OSD and/or a closed caption in a digital broadcasting system and an apparatus therefor. More particularly, the present invention relates to a method of synthesizing an OSD and/or a closed caption with an image of each view in a system providing a multiview 3 dimensional image and an apparatus therefor.

BACKGROUND ART

As the dissemination of a 3 dimensional television (3DTV) is raging, a transmission of a 3D image content performed by a digital broadcasting as well as the dissemination of the 3D image content performed by a storing media is vitalized.

In general, a 3 dimensional image provides a 3D effect using a principle of stereo vision of two eyes. Since a human feels perspective via parallax of two eyes, in other word, binocular parallax due to a space between two eyes apart from each other about 65 mm, the 3D image may provide the 3D effect and the perspective in a manner of providing an image, which makes a left eye and a right eye see a related plane image, respectively.

The 3D image display method includes a stereoscopic technique, a volumetric technique, a holographic technique, and the like. In case of the stereoscopic technique, it provides a left view image supposed to be watched by a left eye and a right view image supposed to be watched by a right eye. The stereoscopic technique enables to recognize a 3D image effect in a manner of making the left eye and the right eye watch the left view image and the right view image respectively using a polarized glasses or a display device itself.

In case of a stereoscopic 3D image content, if two similar images having viewpoints different from each other are transmitted, the stereoscopic technique uses a technique that a receiver displays a 3D image using the two images. In case that the 3D image is displayed by the receiver, a 3D image is provided in a manner that the binocular disparity occurs due to a disparity between a left image and a right image.

In this case, the disparity corresponds to a horizontal distance difference between a pixel of a left image and a pixel of a right image indicating a single pixel of a 3 dimensional image.

In order to implement 3 dimensional display of a glassless mode, study on a method of playing a multiview image is in progress. The multiview image is played in a manner of receiving an input of two or more images or is displayed on a screen in a manner of synthesizing images of a virtual view using the inputted images.

In a current 3DTV receiver, a viewer can watch a limitative 3D image of a fixed view only. Yet, an ultimate objective of 3D image broadcasting is to enable a viewer to freely select a preferred view. Hence, study and research on various fields such as multiview broadcasting, a glassless 3DTV and the like to implement the objective are in progress.

A TV should be operable while a viewer is watching broadcasting or an image. According to a legacy art, if a user operates a TV in the middle of watching a 3D image, a case that a position (depth) on which an OSD (on screen display) is displayed vitiates a depth of 3D broadcasting or a 3D image may occur.

Meanwhile, a closed caption is one of TV character multiplex broadcast services and is used for a caption service for a hearing handicapped person. The closed caption is widely used as much as 70% of big 3 television prime time programs of the United States. When the closed caption is displayed on a 3DTV, it is necessary to display the caption on a position (depth) according to a relationship between 3D broadcast or a 3D image and the caption to smoothly display the caption.

Yet, according to a related art, since a scheme of defining a depth of a caption is not proposed, a case that 3D broadcasting or a 3D image and a caption vitiate mutual 3D effect may occur.

DISCLOSURE OF THE INVENTION

Technical Tasks

A technical task of the present invention is to solve the aforementioned problem, i.e., is to display an OSD on an appropriate position (depth) in a multiview 3 dimensional display.

Another technical task of the present invention is to solve the aforementioned problem, i.e., is to make an OSD not vitiate a 3D effect of a multiview 3 dimensional display in each view in the multiview 3 dimensional display.

Another technical task of the present invention is to solve the aforementioned problem, i.e., is to calculate or define an appropriate display position of an OSD when a user watches a 3D image of a glassless 3DTV mode using a multiview 3 dimensional display.

Another technical task of the present invention is to solve the aforementioned problem, i.e., is to solve a problem of cutting an OSD, which is deviated from a screen due to a disparity, when the OSD is generated for each view in a multiview 3 dimensional display.

Another technical task of the present invention is to solve the aforementioned problem, i.e., is to display a closed caption on an appropriate position (depth) in each view of a multiview 3 dimensional display.

Another technical task of the present invention is to solve the aforementioned problem, i.e., is to make a closed caption not vitiate a 3D effect of a 3 dimensional display in each view of a multiview 3 dimensional display.

The other technical task of the present invention is to solve the aforementioned problem, i.e., is to calculate or define an appropriate display position of a closed caption when a user watches a 3D image of a glassless 3DTV mode using a multiview 3 dimensional display.

Technical Solution

To achieve these and other advantages and in accordance with the purpose of the present invention, as embodied and broadly described, according to one embodiment, a method of processing a 3 dimensional image including an additional object in a system providing a multiview image includes the steps of receiving video images and depth images for a plurality of views, configuring an additional object among additional objects displayed on the video images for a plurality of the views as a reference additional object, calculating a disparity of a pixel of a video image adjacent to an area on which the reference additional object and an edge of the reference additional object, synthesizing the reference additional object with a video image of a first view and a video image of a second view in a manner of applying a disparity value equal to or greater than the calculated disparity value to the reference additional object, and formatting the video image of the first view and the video image of the second view with which the reference additional object is synthesized as a 3 dimensional image.

Preferably, the reference additional object configuring step includes the steps of identifying a video image of a very left view and a video image of a very right view among the video images for a plurality of the views and if a distance between an additional object, which is included in the identified video image, and a left edge of a screen is shorter than a distance between the additional object and a right edge of the screen, configuring an additional object displayed on the video image of the very right view as the reference additional object and if the distance between the additional object and the left edge of the screen is longer than the distance between the additional object and the right edge of the screen, configuring an additional object displayed on the video image of the very left view as the reference additional object.

Preferably, the step of calculating the disparity of the pixel of the video image includes the steps of identifying a pixel indicating a biggest depth among pixels adjacent to the area on which the reference additional object is displayed and an edge of the reference additional objet and calculating a disparity of the identified pixel.

Preferably, the depth images include a depth map and a camera parameter.

Preferably, the additional object corresponds to an OSD (on screen display) or a closed caption.

Preferably, the method further includes the step of synthesizing a second reference additional object with the video image of the first view and the video image of the second view with which the reference additional object is synthesized.

Preferably, the second reference additional object synthesizing step includes the steps of generating information for identifying a difference of a depth between the reference additional object and the second reference additional object and synthesizing the second reference additional object with the video image of the first view and the video image of the second view by applying a disparity indicating the difference of the depth indicated by the generated information.

To further achieve these and other advantages and in accordance with the purpose of the present invention, according to one embodiment, a receiver configured to process a 3 dimensional image including an additional object in a system providing a multiview image includes a decoder configured to decode video images and depth images for a plurality of views, a disparity calculation unit configured to configure an additional object among additional objects displayed on the video images for a plurality of the views as a reference additional object and configured to calculate a disparity of a pixel of a video image adjacent to an area on which the reference additional object and an edge of the reference additional object, an additional object synthesizing unit configured to synthesize the reference additional object with a video image of a first view and a video image of a second view in a manner of applying a disparity value equal to or greater than the calculated disparity value to the reference additional object, and a 3 dimensional display formatter configured to format the video image of the first view and the video image of the second view with which the reference additional object is synthesized as a 3 dimensional image.

Preferably, the disparity calculation unit is configured to identify a video image of a very left view and a video image of a very right view among the video images for a plurality of the views, if a distance between an additional object, which is included in the identified video image, and a left edge of a screen is shorter than a distance between the additional object and a right edge of the screen, the disparity calculation unit is configured to configure an additional object displayed on the video image of the very right view as the reference additional object and if the distance between the additional object and the left edge of the screen is longer than the distance between the additional object and the right edge of the screen, the disparity calculation unit is configured to configure an additional object displayed on the video image of the very left view as the reference additional object.

Preferably, the disparity calculation unit is configured to identify a pixel indicating a biggest depth among pixels adjacent to the area on which the reference additional object is displayed and an edge of the reference additional objet and the disparity calculation unit is configured to calculate a disparity of the identified pixel.

Preferably, the depth images include a depth map and a camera parameter.

Preferably, the additional object corresponds to an OSD (on screen display) or a closed caption.

Preferably, the additional object synthesizing unit is configured to synthesize a second reference additional object with the video image of the first view and the video image of the second view with which the reference additional object is synthesized.

Preferably, the disparity calculation unit is configured to generate information for identifying a difference of a depth between the reference additional object and the second reference additional object and the disparity calculation unit is configured to synthesize the second reference additional object with the video image of the first view and the video image of the second view by applying a disparity indicating the difference of the depth indicated by the generated information.

Advantageous Effects

According to the present invention, it is able to display an OSD or a closed caption on an appropriate position of an image of each view in environment providing a multiview 3 dimensional image.

According to the present invention, it is able to prevent a part of an OSD or a part of a closed caption from being cut and displayed in a manner of configuring the OSD or the closed caption to be positioned at the outside of a screen in an image of each view in environment providing a multiview 3 dimensional image.

According to the present invention, it is able to make interruption between a plurality of an OSD and a closed caption not to be occurred when a plurality of the OSD and the closed caption are displayed in environment providing a multiview 3 dimensional image.

BEST MODE

Figure 1:
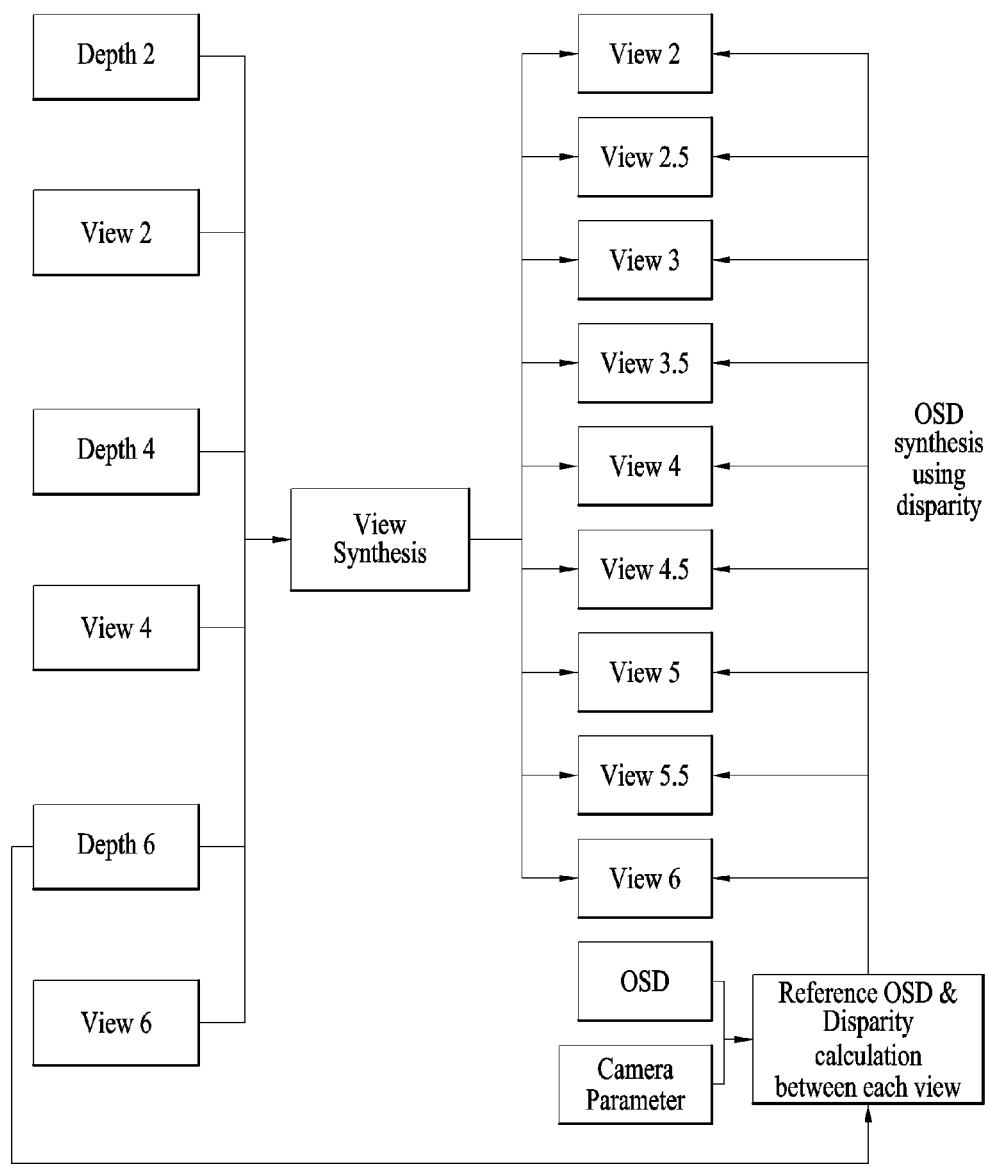
FIG. 1 is a diagram for a relationship of each image to display an OSD on a multiview 3 dimensional image according to one embodiment of the present invention.

Reference will now be made in detail to the preferred embodiments of the present invention, examples of which are illustrated in the accompanying drawings. Yet, the present invention may be non-limited or non-restricted by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The method of expressing a 3 dimensional image may include a stereoscopic technique considering two viewpoints and a multiple view image technique (or a multi-view technique) considering 3 or more viewpoints. Comparably, a conventional single view image technique may be called a monoscopic image technique.

The stereoscopic technique uses a pair of image, i.e., a left view image (hereinafter a left image) and a right view image (hereinafter a right image) obtained by photographing a same subject with a left camera and a right camera, which are away a certain distance from each other. Or, the stereoscopic technique uses a pair of image consisting of a reference image and an additional image. The multi-view technique uses 3 or more images obtained by photographing with 3 or more cameras having a certain distance and angle. The multi-view technique corresponds to a technique providing the left image and the right image of the stereoscopic technique in each viewpoint.

According to the present invention, the stereoscopic technique includes a side-by-side, a top-down, a checker board technique, and the like. The side-by-side technique is a technique configuring one stereoscopic image by performing a half down sampling horizontally on each of a left image and a right image, respectively and situating one sampled image in a left region and the other sampled image in a right region. The top-down technique is a technique configuring one stereoscopic image by performing a half down sampling vertically on each of a left image and a right image, respectively and situating one sampled image in a top region and the other sampled image in a bottom region. The checker board technique is a technique configuring one image by performing a half down sampling in a manner that a left image and a right image respectively intersect horizontally and vertically. Yet, the stereoscopic technique according to the present invention may be non-limited or non-restricted by the aforementioned example.

As an example, it is also possible to provide a 3D image service in a manner of transceiving two images having an intact resolution without going through the aforementioned down sampling process. In this case, it is able to separately configure a transmission stream transmitting a left image and a right image, respectively. In particular, a specific transmission stream transmits left images and another transmission stream can transmit right images. In this case, each of the transmission streams can be utilized as a stream for a 2 dimensional image service.

FIG. 1 is a diagram for a relationship of each image to display an OSD on a multiview 3 dimensional image according to one embodiment of the present invention.

A multiview image can be implemented in various ways. A transmitting end transmits images of each view by encoding the images and a receiving end can play each of the images. Or, the transmitting end transmits images of views less than the number of displayed views and depth images according to the images by encoding the images and the depth images and the receiving end synthesizes the rest of views using the images and the depth images and may be then able to display the rest of views on a screen.

In a multiview image, it may be able to use image compression schemes different from each other for an image of each view according to each environment. In some cases, there may or may not exist additional information, which is transmitted in relation to an image of each view. In this case, display of an OSD in each view of a multiview image should also be processed by a scheme different from each other according to additional information, which is transmitted in relation to an image of each view.

When a user watches a 3 dimensional image, it is profitable to display an OSD within a depth range, which is seen as closer to the user compared to a 3D image in the vicinity of the OSD, to more stably express the OSD.

In order for a receiver to display the OSD, it is necessary to have information related to the display of the OSD. The information is called OSD display information in the present invention. The OSD display information can be determined by a manufacturer of the receiver in advance, can be designated by a user or can be designated as a guideline in relation to contents transmitted by a transmitting side. The OSD display information can include a size of a window on which the OSD is displayed, a position of a window, etc.

If a transmitter transmits all images for each view by encoding the images for a multiview 3 dimensional image (i.e., if a depth image is not separately transmitted), it is not necessary for a receiver to synthesize an image of a virtual view to provide the multiview 3 dimensional image. In this case, the receiver follows a scheme identical to a method of displaying an OSD of a stereoscopic image (3 dimensional image) in each view. In particular, the receiver obtains information on a maximum and/or a minimum depth included in a 3 dimensional image in each view and can control the OSD to be displayed in a manner of being closer to a user compared to a depth indicated by the 3 dimensional image of a corresponding view. Or, the receiver obtains information on a maximum and/or a minimum depth included in a 3 dimensional image in each view and can control the OSD to be displayed in a manner of being farther from a user compared to a depth indicated by the 3 dimensional image of a corresponding view.

For a multiview 3 dimensional image, if the transmitter transmits a part of images only among a plurality of images included in the multiview 3 dimensional image by encoding a part of the images and transmits a depth image related to a part of the images, the receiver can synthesize a 3 dimensional image in each view according to a procedure described in the following.

The receiver displays images in a manner of synthesizing an additional image as well as an inputted image using a depth image. If the receiver synthesizes a virtual image using the depth image and uses the virtual image to display a 3 dimensional image of each view, it is able to express images of many views with a small amount of data. In this case, the receiver can control a 3D effect of an OSD using the transmitted depth image. A video compressing scheme including a depth image can include a camera parameter. The transmitter can compress a depth image using a camera parameter or transmits a camera parameter to the receiver irrespective of a depth image. The receiver can synthesize a virtual image in a manner of using a depth image to which information of a camera parameter is reflected or using a camera parameter, which is transmitted irrespective of a depth image, together with the depth image.

Referring to FIG. 1, images for a view 2, a view 4 and a view 6 among multiple views and a depth image 2, a depth image 4 and a depth image 6 for the corresponding views can be transmitted to the receiver. In this case, it is able to synthesize a view image 2.5, a view image 3, a view image 3.5, a view image 4.5, a view image 5 and a view image 5.5 using the view image 2, the view image 4, the view image 6, the depth image 2, the depth image 4 and the depth image 6. In this case, if a reference image corresponds to the view image 6, the receiver generates an OSD of the view 6 as a reference OSD and may be then able to synthesize an OSD of each view based on the reference OSD. In a procedure of generating the reference OSD, the receiver can use a depth image for a reference image and/or a camera parameter.

A procedure for the receiver to generate a virtual image for each view is explained in the following.

Figure 2:
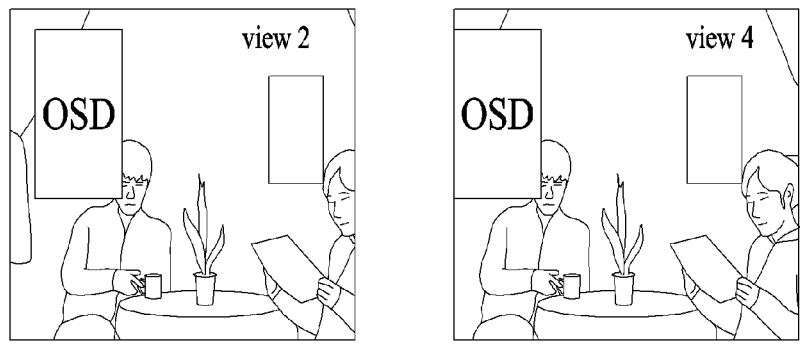
FIG. 2 is a diagram for an OSD displayed on images of a part of views among a multiview 3 dimensional image according to one embodiment of the present invention.
Figure 2:
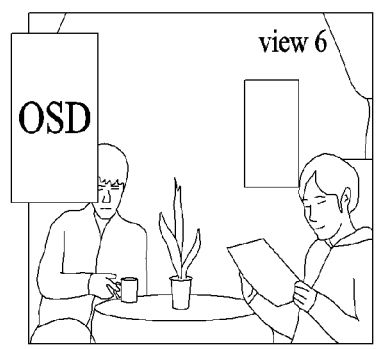

FIG. 2 is a diagram for an OSD displayed on images of a part of views among a multiview 3 dimensional image according to one embodiment of the present invention.

As mentioned in the foregoing description, a receiver can generate an image of a virtual view in accordance with display environment (number of views) using images of a part of views and additional information according to the images. The receiver determines a level of a 3D effect of images displayed on each screen and may be able to display an OSD including a 3D effect which is appropriately adjusted in accordance with the level.

In this case, it is necessary to consider a 3D effect of the OSD as well. The OSD should be displayed on images of each view. In particular, the OSD should be displayed on a position closer to a user compared to 3D objects displayed in each view. When the OSD is displayed on a screen, a size of the OSD and location information of the OSD may be determined in advance.

In order to display a 3D effect of the OSD in each view, a position of the OSD in each view is differently expressed. The 3D effect of the OSD can be configured to be seen as closer to a viewer compared to surrounding of the OSD in a manner of determining a level of a 3D effect of the surrounding of the OSD.

If a different OSD additionally occurs on the OSD, the lately occurred OSD is displayed in a manner of being closer to a viewer compared to the legacy OSD. By doing so, in case of displaying a plurality of OSDs, a viewer can conveniently recognize an OSD. To this end, the receiver can control a plurality of the OSDs to be displayed using depth range information indicating a range of depth capable of being expressed by the receiver, OSD depth difference information for designating a difference between a depth of a previously occurred OSD and a depth of an additionally occurred OSD and/or OSD number information indicating the maximum number of OSDs capable of being displayed on a screen in a manner of being overlapped with each other. The aforementioned information can be designated by a manufacturer of the receiver, can be transmitted in a manner of being designated by the transmitter in advance or can be designated by a user. For example, in case of displaying a plurality of OSDs, the receiver can process a plurality of the OSDs in a manner of differentiating a depth between OSDs as much as a depth difference designated by the OSD depth difference information. And, the receiver can calculate the OSD depth difference information to make OSDs as many as the numbers identified by the OSD number information to be displayed with a depth difference within a range of a depth identified by the depth range information capable of being processed by the receiver.

Meanwhile, in order to display an OSD on each depth in each view of a multiview 3 dimensional image, the receiver can generate a reference OSD. In particular, the receiver displays an OSD (e.g., reference OSD) for a single view among displayed views and displays a reference OSD in a manner of moving the reference OSD as much as a disparity from images of the rest of views on the basis of the OSD.

When an OSD of each view is configured using the aforementioned method, if an OSD is weighted towards one side of an inputted image, a position of the OSD may deviate from a screen in a procedure of being synthesized with an image of a different view. In particular, if the reference OSD moves as much as a disparity, the disparity can be configured to display an OSD of a prescribed view on a position deviated from a screen on which an image is displayed.

For example, when an OSD, which is displayed on the left of a screen, is put on a very left view of an input image, if the input image is continuously displayed in a right view in a manner of horizontally moving as much as a disparity, which is calculated to display a 3D effect, an OSD position may be deviated from the screen. Hence, in order to display the OSD, it is necessary to generate in a safety area.

In particular, referring to FIG. 2, if an OSD, which is displayed at the left of a screen in a second view, is set to a reference OSD, the reference OSD should be displayed in an image of a fourth view and an image of a sixth view in a manner of being moved to the left for the images of the fourth view and the sixth view, which have moved to the right compared to the second view.

In this case, as shown in FIG. 2, the OSD is on an edge of the screen in the image of the fourth view. And, since it is necessary to configure a disparity (moving distance of the reference OSD) to display the OSD at the outside of the screen in the image of the sixth view, a part of the OSD may be cut and the remaining OSD is displayed in an actual image of the sixth view.

Figure 3:
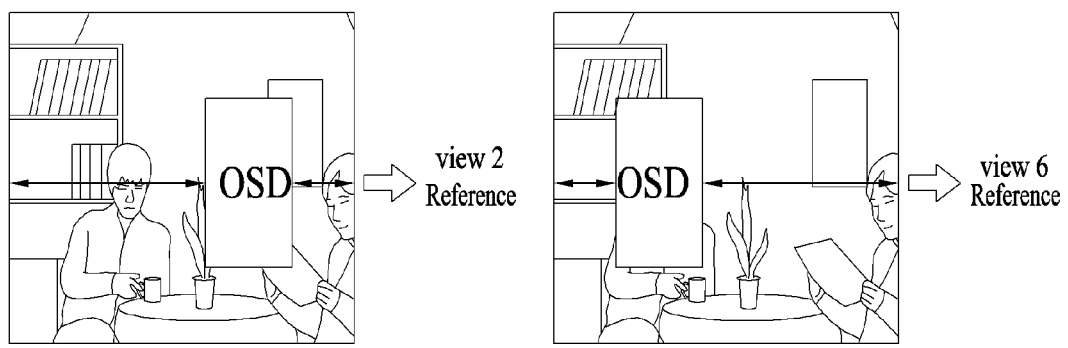
FIG. 3 is a diagram for a method of configuring a reference OSD according to one embodiment of the present invention.

FIG. 3 is a diagram for a method of configuring a reference OSD according to one embodiment of the present invention.

As mentioned in the foregoing description, a phenomenon that a part of an OSD is cut and the rest of the OSD is displayed only may occur. In order to solve the phenomenon, according to one embodiment of the present invention, an OSD displayed in the very left view or the very right view is configured as a reference OSD. In this case, it is highly probable to provide a depth image of an inputted view instead of a virtual view to an outermost view (the very left view or the very right view). The OSD can be displayed by 2 dimensions or 3 dimensions.

A receiver measures a distance between an OSD and a left edge of a screen and a distance between the OSD and a right edge of the screen and selects an OSD of an input image of a view in a direction of a long distance as a reference OSD. In particular, if the distance between the OSD and the left edge of the screen is shorter than the distance between the OSD and the right edge of the screen, the receiver configures an OSD of an image of the very right view as a reference OSD. On the contrary, if the distance between the OSD and the left edge of the screen is longer than the distance between the OSD and the right edge of the screen, the receiver configures an OSD of an image of the very left view as a reference OSD. A size of an OSD can be restricted to a size equal to or less than a prescribed range in consideration of synthesizing an OSD in each view of a multiview 3 dimensional image. In this case, information for configuring a maximum value of the size of the OSD (e.g., a horizontal/vertical length of the OSD or a diagonal length of the OSD) can be included in OSD display information. If the size of the OSD exceeds the maximum value of the OSD size included in the PSD display information, the receiver reduces a size of the reference OSD not to exceed the maximum value and may be then able to synthesize the OSD.

Referring to FIG. 3, if a distance between an OSD and a left edge of a screen is longer than a distance between the OSD and a right edge of the screen, an OSD in a second view corresponding to a very left view providing a view image and a depth image is configured as a reference OSD. On the contrary, if a distance between an OSD and a left edge of a screen is shorter than a distance between the OSD and a right edge of the screen, an OSD in a sixth view corresponding to a very right view providing a view image and a depth image is configured as a reference OSD.

As a different embodiment, an image becoming a reference for measuring a distance between an OSD and a left edge of a screen and a distance between the OSD and a right edge of the screen corresponds to an image of a view when a user watches the screen at the front. In particular, a position on which an OSD is displayed is determined in an image of a front view and if a distance between the OSD and a left edge of the screen is shorter than a distance between the OSD and a right edge of the screen, the receiver configures an OSD of an image of a very right view of an input image as a reference OSD. On the contrary, a position on which an OSD is displayed is determined in an image of a front view and if a distance between the OSD and a left edge of the screen is longer than a distance between the OSD and a right edge of the screen, the receiver configures an OSD of an image of a very left view of an input image as a reference OSD.

Figures 4, 5:
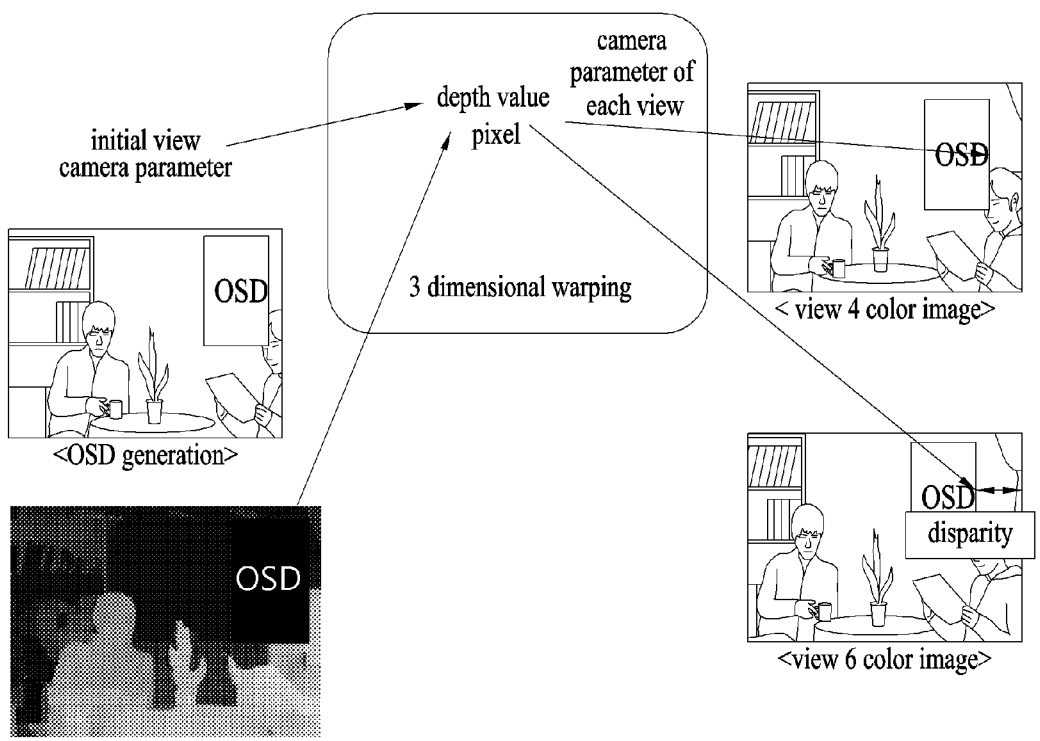
FIG. 4 is a diagram for an equation of calculating a disparity according to one embodiment of the present invention.
FIG. 5 is a diagram for a procedure of synthesizing an OSD with a multiview 3 dimensional image according to one embodiment of the present invention.

FIG. 4 is a diagram for an equation of calculating a disparity according to one embodiment of the present invention.

According to the present invention, a 3D image and an OSD are synthesized with each other by calculating a position (depth) on which the OSD is displayed. In this case, a pixel of a biggest depth value is selected from pixels adjacent to a position of the OSD (pixels positioned near an edge of the OSD) and pixels of a position identical to the position of the OSD and it is able to convert it into a disparity value with each view.

It is able to calculate a disparity using a method of using a Depth to Disparity equation and a method of using 3D warping. A formula shown in FIG. 4 corresponds to a formula used by the method of using the Depth to Disparity equation.

Conversion using the Depth to Disparity equation can use a formula of 1-D Mode of VSRS3.5.

A receiver can convert a depth value of a selected pixel into a real depth of a 3 dimensional coordinate. In this case, Znear and Zfar correspond to items inputted together with an image. The receiver calculates Focal Length, Camera distance and point offset using an inputted or received camera parameter.

As a different method of calculating a disparity, it may use a conversion method using 3D warping. In this case, it may be able to use a method of General Mode of VSRS3.5.

The receiver performs 3D warping to each view using a camera parameter of an input view/target view and input color/depth view image. The receiver searches for a horizontal position difference (disparity) between a 3D warped point and an original point.

When a disparity for an image near an OSD is calculated using the aforementioned method, the receiver configures a disparity of the OSD to be equal to or greater than the calculated disparity. In particular, the receiver configures the disparity of the OSD to make the OSD to be displayed on a position closer to a viewer compared to the image near the OSD.

FIG. 5 is a diagram for a procedure of synthesizing an OSD with a multiview 3 dimensional image according to one embodiment of the present invention.

According to one embodiment of the present invention, a receiver can deduct a disparity value according to a depth configured to display an OSD in a corresponding a view using a depth image of a specific view and/or a camera parameter. In particular, the receiver displays overlaid OSD in a manner of horizontally moving the OSD as much as a disparity calculated by each view. If the OSD is synthesized using the disparity value, it is able to more intuitively and easily control a 3D effect compared to using a depth. In this case, a procedure of deducting the disparity value of the OSD follows what is mentioned earlier in the foregoing description. If the disparity of the OSD is deducted, the OSD is displayed on a corresponding depth with a corresponding disparity. The receiver can display the OSD on a different view image while maintaining the disparity of the OSD deducted from a specific view. In this case, the receiver displays the OSD in a manner of horizontally moving a position of the OSD as much as a horizontal distance difference of pixels between an image of the specific view and an image of a different view.

In this case, the disparity can be interpreted as a difference of a horizontal distance between pixels indicating an identical object in images of each view of a multiview 3 dimensional image.

For example, if an image of a second view is selected as an initial view, the receiver obtains a disparity value of a neighboring image using a depth of the neighboring image of an area on which an OSD is displayed in the second view. The receiver configures a disparity value of the OSD in the second view based on the obtained disparity value. In case of displaying the OSD in an image of a fourth view and an image of a sixth view, the receiver displays the OSD on a depth corresponding to the configured disparity value of the OSD. The receiver horizontally moves the OSD of the second view as much as a horizontal distance difference between the image of the second view and the image of the fourth view and/or a horizontal distance difference between the image of the second view and the image of the sixth view and displays the OSD of the second view on the image of the fourth view and/or the image of the sixth view.

Meanwhile, in case of providing a 3 dimensional image using the image of the fourth view and the image of the sixth view, OSDs respectively included in the image of the fourth view and the image of the sixth view are displayed on positions including a horizontal distance difference as much as the deducted disparity value using the aforementioned method. In this case, a viewer watching the 3 dimensional image using the image of the fourth view and the image of the sixth view can see an OSD, which is displayed on a depth indicated by the disparity deducted using the aforementioned method.

A method of synthesizing an OSD includes the aforementioned method of horizontally moving a synthesized image and a synthesizing method used to be used in a legacy stereoscopic.

Figure 6:
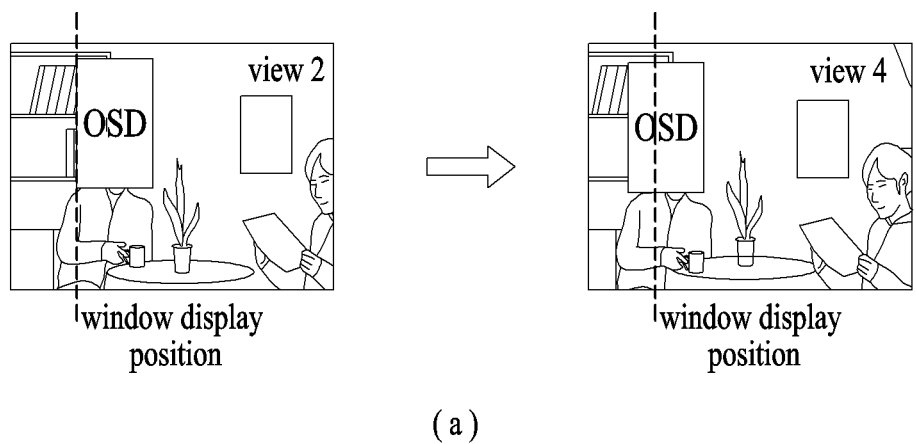
FIG. 6 is a diagram for an example of synthesizing an OSD with images of each view of a multiview 3 dimensional image according to one embodiment of the present invention.
Figure 6:
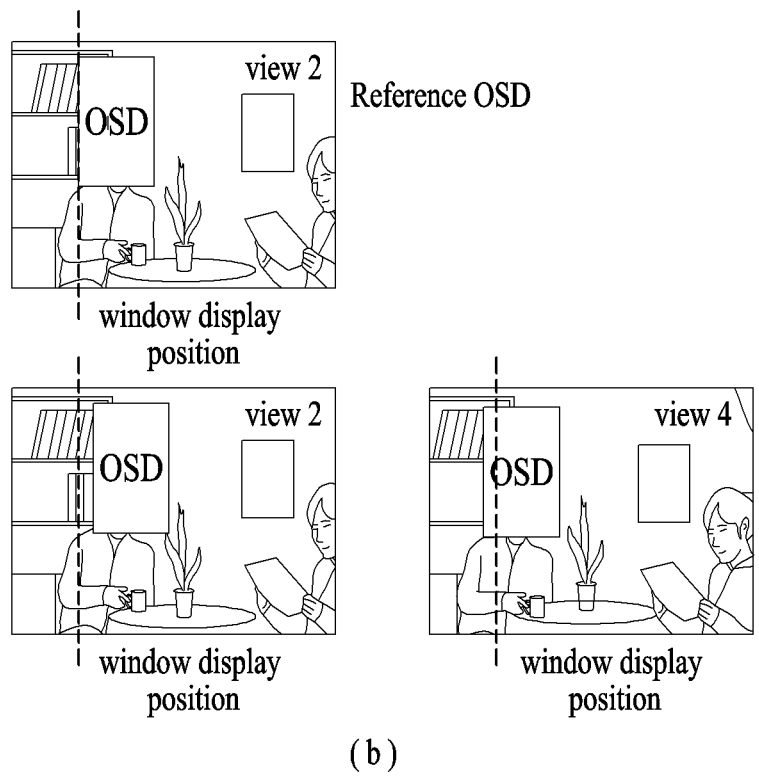

FIG. 6 is a diagram for an example of synthesizing an OSD with images of each view of a multiview 3 dimensional image according to one embodiment of the present invention.

Referring to FIG. 6 (a), if a depth of an OSD is determined based on an image of a second view, a receiver can display an image of a fourth view in a manner of horizontally moving images including an OSD of the second view at a time. In particular, the image of the second view including the OSD is moved to the left as much as a prescribed distance and is displayed for the image of the fourth view. In this case, it is not necessary for the receiver to perform a procedure of separately synthesizing an OSD in each view.

Referring to FIG. 6 (b), if a depth of an OSD is determined based on an image of a second view, a receiver configures an OSD of the second view as a reference OSD. The receiver horizontally moves an OSD to the right on the basis of a position of the reference OSD and displays the OSD on the image of the second view. And, the receiver horizontally moves the OSD to the right on the basis of the position of the reference OSD and displays the OSD on an image of a fourth view.

In particular, the receiver configures the reference OSD and obtains a maximum horizontal distance difference of an area near the OSD between the image of the second view and the image of the fourth view. The receiver horizontally moves the reference OSD to the left or the right as much as a position of images of synthesized views compared to the obtained horizontal distance difference and synthesizes the image of the second view including an OSD and the image of the fourth view including an OSD with each other.

Figure 7:
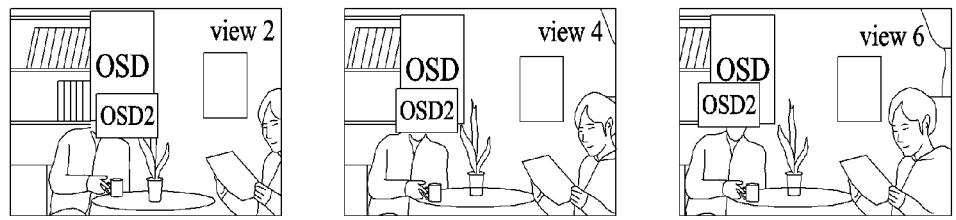
FIG. 7 is a diagram for a procedure of displaying a plurality of OSDs according to one embodiment of the present invention.

FIG. 7 is a diagram for a procedure of displaying a plurality of OSDs according to one embodiment of the present invention.

When an additional OSD is displayed on an OSD, it is necessary for a receiver to configure the additional OSD to be displayed in a manner of being closer to a viewer compared to the legacy OSD. In particular, the receiver should configure a disparity of the additional OSD to be greater than a disparity of the legacy OSD.

In order to display the additional OSD, the receiver may use depth range information indicating a range of a depth capable of being expressed by the receiver, OSD depth difference information for designating a depth difference between a previously occurred OSD and an additionally occurred OSD and/or OSD number information indicating the maximum number of OSDs capable of being displayed on a single screen in a manner of being overlapped with each other.

The receiver determines the number of OSDs to be additionally displayed between a depth indicated by a disparity of a previously existed OSD and a depth of a range capable of being expressed by the receiver identified by the depth range information. The receiver calculates a depth between OSDs necessary for displaying the number of OSDs with an identical depth difference and applies a disparity corresponding to the depth to the additional OSDs. By doing so, it is able to synthesize an image including the additional OSDs.

The number of additional OSDs may vary according to the number of OSDs requested to be displayed by a user. Or, the number of additional OSDs can be applied at a time on the basis of the number of OSDs indicated by the OSD number information.

Or, if additional OSDs occur, the receiver can synthesizes the additional OSDs without a separate calculation procedure while maintaining a depth difference indicated by the OSD depth difference information.

Referring to FIG. 7, a horizontally moving distance of an OSD (legacy OSD) moving in each of an image of a second view, an image of a fourth view and an image of a sixth view is shorter than a horizontally moving distance of an OSD (additional OSD) moving in each of the image of the second view, the image of the fourth view and the image of the sixth view. In particular, a disparity of the OSD is smaller than a disparity of the OSD2.

In case of displaying a plurality of OSDs, it is able to resynthesize images of each view in a manner of configuring a lastly added OSD as a reference OSD to prevent a phenomenon of cutting an OSD according to movement of the OSD in each view from being occurred. In particular, since a disparity of the lastly added OSD is biggest, if the lastly added OSD is not cut in the images of each view, an OSD immediately before the lastly added OSD is not cut in the images of each view.

In order to prevent a phenomenon of resynthesizing an image including an OSD from being occurred in a procedure of processing a plurality of OSDs, it may be able to use the aforementioned depth range information indicating a range of a depth capable of being expressed by the receiver, the OSD depth difference information for designating a depth difference between a previously occurred OSD and an additionally occurred OSD and/or the OSD number information indicating the maximum number of OSDs capable of being displayed on a single screen in a manner of being overlapped with each other. In particular, the receiver assumes a case of displaying a plurality of OSDs permitted by the OSD number information and may be able to determine a disparity value necessary for expressing a last OSD. In this case, the receiver can recognize a depth difference between the last OSD and a first OSD using the OSD depth difference information. The receiver calculates a disparity indicating a depth on which the first OSD is displayed using the aforementioned method and determines a disparity of the last OSD in consideration of a depth difference between the first OSD and the last OSD. The receiver can determine a position of an OSD in each view in consideration of the disparity of the last OSD. In particular, the receiver determines a position of an OSD to make the last OSD not to be cut from images of each view.

Figure 8:
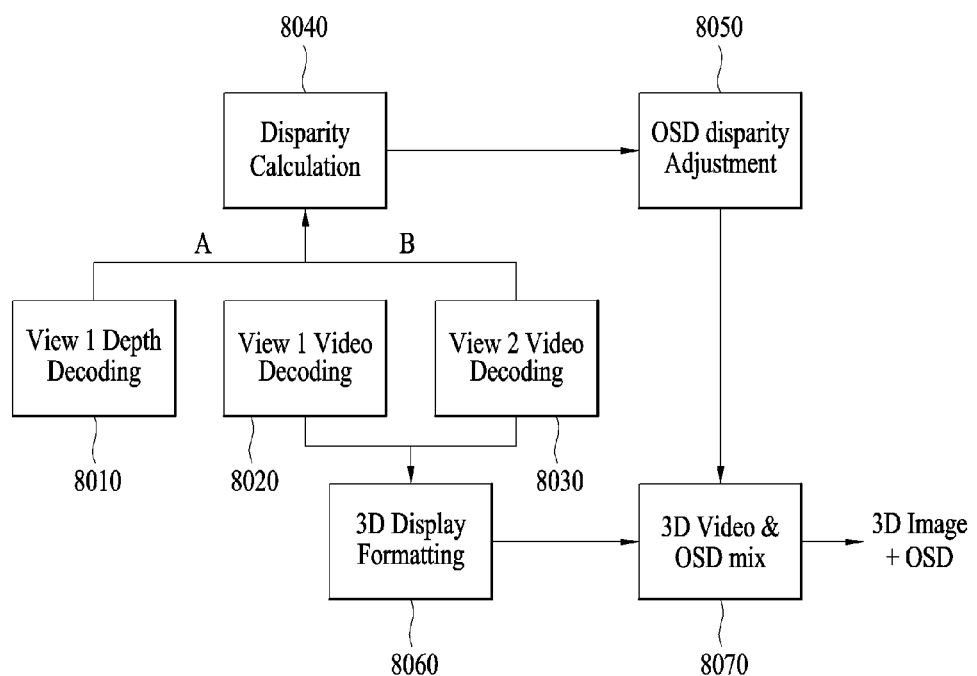
FIG. 8 is a diagram for a part of blocks of a multiview 3 dimensional image receiver according to one embodiment of the present invention.

FIG. 8 is a diagram for a part of blocks of a multiview 3 dimensional image receiver according to one embodiment of the present invention.

According to one embodiment, a multiview 3 dimensional image receiver can include a view 1 depth image decoder 8010, a view 2 video image decoder 8020, a disparity calculation unit 8040, an OSD disparity adjustment unit 8050, a 3 dimensional display formatter 8060 and/or a 3 dimensional video/OSD mixer 8070.

The view 1 depth image decoder 8010 decodes a received depth image of a first view. In this case, the depth image can include a depth map and/or a camera parameter.

The view 1 video image decoder 8020 decodes a video image of a first view.

The view 2 video image decoder 8030 decodes a video image of a second view. The video image of the second view can include a camera parameter. In particular, the camera parameter can be received together in a procedure of receiving a depth image or in a procedure of receiving a video image.

Although the drawing shows a decoder decoding a depth image and/or a video image of a first view and a second view only, in case of receiving a depth image and/or a video image of multiple views, a depth image and/or a video image decoder may exist for each of the multiple views. Or, a single decoder may decode a depth image and/or a video image for each view and the decoder can be specifically classified into a functional unit configured to decode an image of each view.

The disparity calculation unit 8040 calculates a disparity of a specific area of a screen based on a depth map, a camera parameter of a first view and/or a camera parameter of a second view. In this case, the specific area of the screen may correspond to an area including pixels near a point on which an OSD is displayed. A method of calculating a disparity is replaced with the explanation mentioned earlier in the foregoing description. If a multiview image is provided, the disparity calculation unit 8040 can determine an OSD of a view to be configured as a reference OSD. A method of determining the reference OSD is replaced with the explanation mentioned earlier in the foregoing description.

The OSD disparity adjustment unit 8050 adjusts a disparity of an OSD in an image of each view using a calculated disparity. The OSD disparity adjustment unit 8050 can configure a value equal to or greater than a calculated disparity value as an OSD disparity value.

The 3 dimensional display formatter 8060 formats a 3 dimensional video image using a video image of a first view, a video image of a second view or a depth image of a second view.

The 3 dimensional video/OSD mixer 8070 arranges an OSD by applying a calculated OSD disparity value to an image of each view included in a formatted 3 dimensional video image. The 3 dimensional video/OSD mixer 8070 provides an image including an OSD to a 3 dimensional image.

Figure 9:
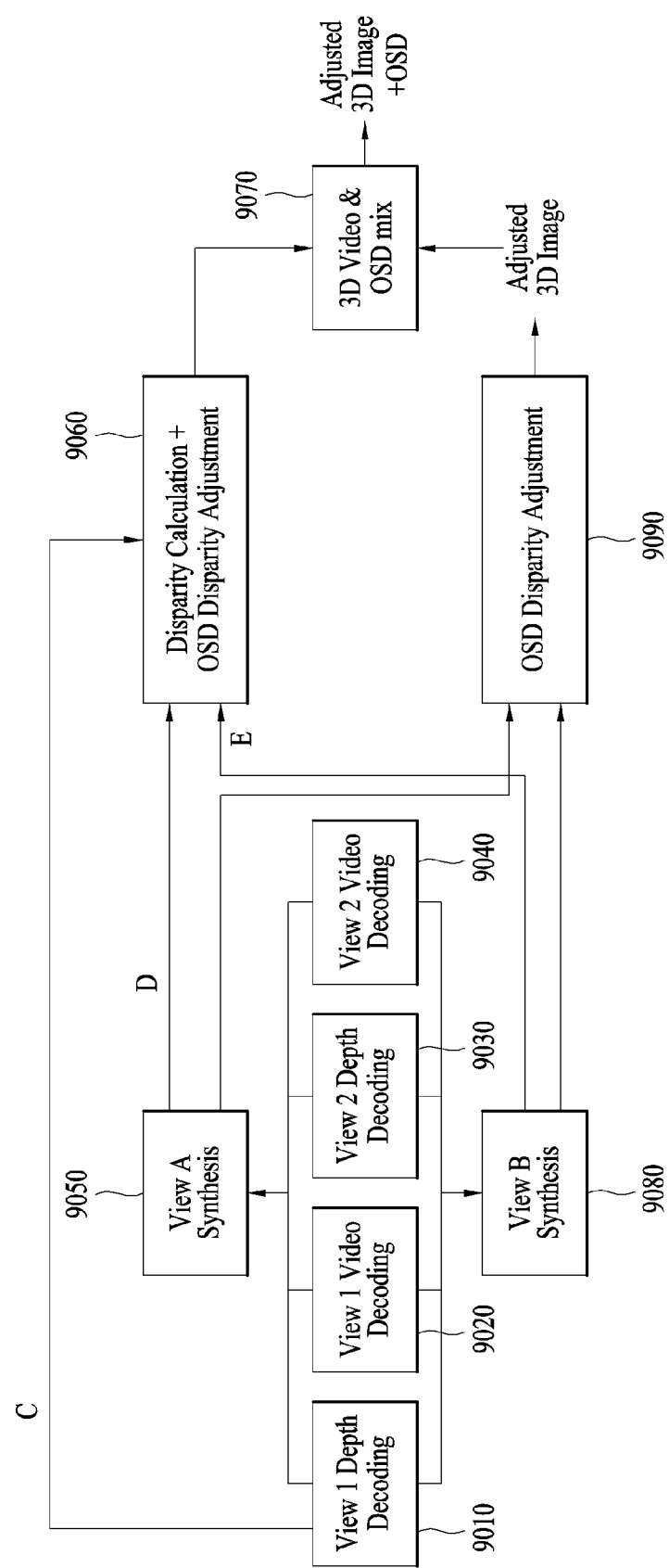
FIG. 9 is a diagram for a part of blocks of a multiview 3 dimensional image receiver according to a different embodiment of the present invention.

FIG. 9 is a diagram for a part of blocks of a multiview 3 dimensional image receiver according to a different embodiment of the present invention.

According to a different embodiment, a multiview 3 dimensional image receiver can include a view 1 depth image decoder 9010, a view 1 video image decoder 9020, a view 2 depth image decoder 9030, a view 2 video image decoder 9040, a view A image synthesizing unit 9050, a disparity calculation unit and an OSD disparity adjustment unit 9060, a 3 dimensional video and OSD mixer 9070, a view B synthesizing unit 9080, and/or a 3 dimensional image formatter 9090.

The view 1 depth image decoder 9010 decodes a received depth image of a first view. In this case, the depth image can include a depth map and/or a camera parameter.

The view 1 video image decoder 9020 decodes a video image of a first view.

The view 2 depth image decoder 9030 decodes a received depth image of a second view. In this case, the depth image can include a depth map and/or a camera parameter The view 2 video image decoder 8030 decodes a video image of a second view.

Although the drawing shows a decoder decoding a depth image and/or a video image of a first view and a second view only, in case of receiving a depth image and/or a video image of multiple views, a depth image and/or a video image decoder may exist for each of the multiple views. Or, a single decoder may decode a depth image and/or a video image for each view and the decoder can be specifically classified into a functional unit configured to decode an image of each view.

The view A image synthesizing unit 9050 synthesizes a video image of a view A using a depth image of a first view, a video image of a first view, a depth image of a second view and/or a video image of a second view.

The disparity calculation unit and the OSD disparity adjustment unit 9060 calculate a disparity value of pixels or objects included in an image using a video image of a view A and/or a video image of a view B. The disparity calculation unit and the OSD disparity adjustment unit 9060 measure a horizontal distance between a pixel of a video image of a view A and a pixel of a video image of a view B indicating an identical point of a 3 dimensional image and may be able to recognize the horizontal distance as a disparity value. In this case, a pixel on which a disparity is measured may correspond to a pixel existing near an edge of an OSD. A method of calculating a disparity is replaced with the explanation mentioned earlier in the foregoing description. The disparity calculation unit and the OSD disparity adjustment unit 9060 configure a disparity to be owned by an OSD using a measured or calculated disparity. In particular, a disparity value between an OSD of a view A and an OSD of a view B can be configured to have a value equal to or greater than the measured or calculated disparity.

The 3 dimensional video and OSD mixer 9070 arranges an OSD to a 3 dimensional image. The 3 dimensional video and OSD mixer 9070 arranges an OSD to an image of each view included in the 3 dimensional image, applies a disparity between OSDs calculated in the aforementioned procedure, and arranges the OSD to each image. In particular, the 3 dimensional video and OSD mixer 9070 arranges an OSD to a 3 dimensional image, which is synthesized using an image of a view A and an image of a view B, in consideration of the calculated disparity of the OSD.

The view B image synthesizing unit 9080 synthesizes a video image of a view B using a depth image of a first view, a video image of a first view, a depth image of a second view and/or a video image of a second view.

The 3 dimensional image formatter 9090 formats images of each view included in a 3 dimensional image to a 3 dimensional image. In particular, the 3 dimensional image formatter 9090 formats an image of a view A and an image of a view B to a 3 dimensional image. The 3 dimensional image formatter 9090 outputs a 3 dimensional image using one or more actual views and/or images of a virtual view.

When a user operates a TV while watching a 3D image, visual fatigue can be minimized and a normal operation can be smoothly performed only when the user feels an OSD (on-screen display) to be closer than the 3D image. According to the aforementioned procedures, when an OSD is displayed according to an operation of a user while the user is watching a 3DTV in a multiview 3DTV, the OSD can be displayed in each view, the OSD should be normally recognized in each view and the OSD can be processed to be recognized as being closer to the user compared to a surrounding image.

Figure 10:
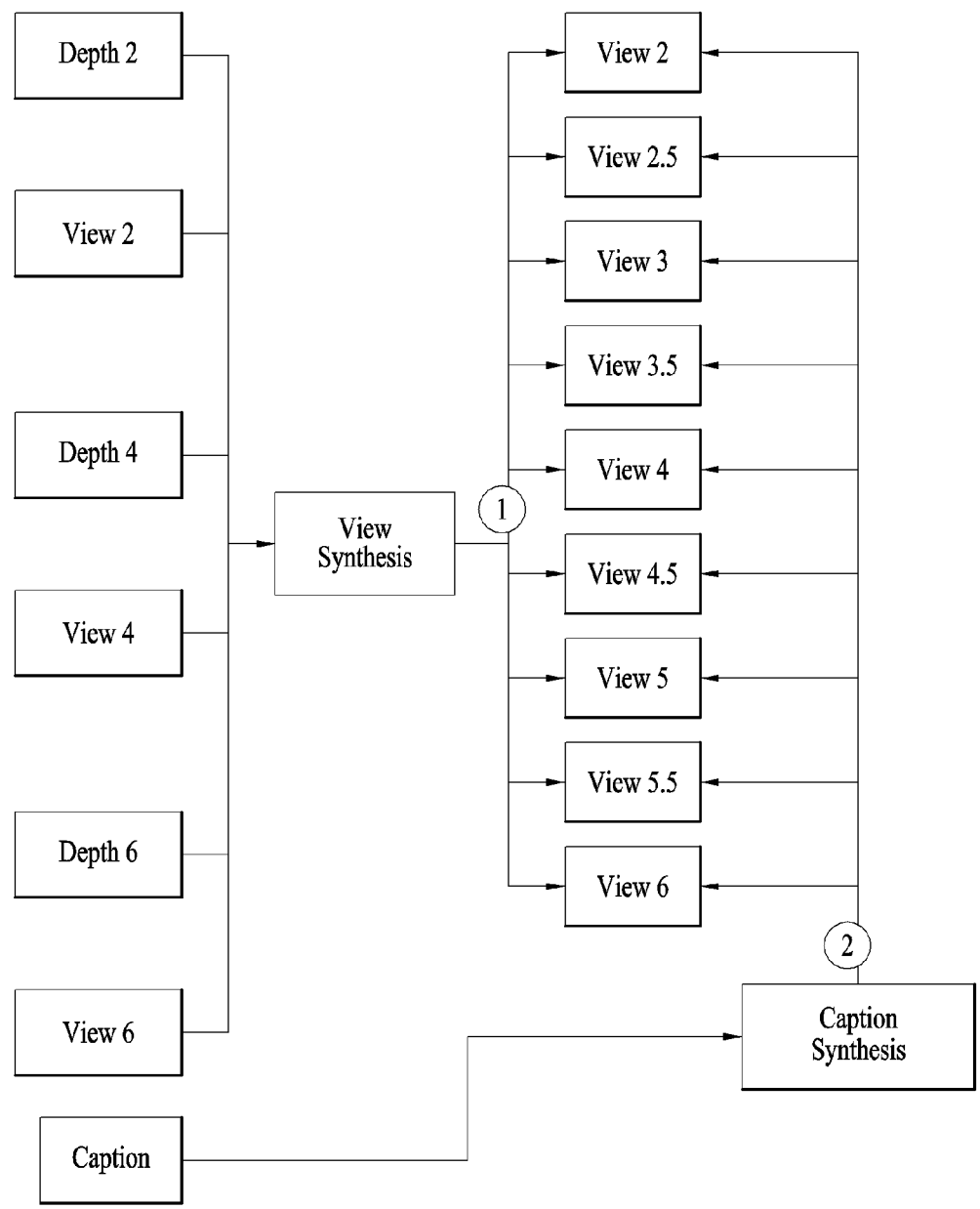
FIG. 10 is a diagram for a relationship of each image to display a closed caption on a multiview 3 dimensional image according to one embodiment of the present invention.

FIG. 10 is a diagram for a relationship of each image to display a closed caption on a multiview 3 dimensional image according to one embodiment of the present invention.

A multiview image can be implemented in various ways. A transmitting end transmits images of each view by encoding the images and a receiving end can play each of the images. Or, the transmitting end transmits images of views less than the number of displayed views and depth images according to the images by encoding the images and the depth images and the receiving end synthesizes the rest of views using the images and the depth images and may be then able to display the rest of views on a screen.

In a multiview image, it may be able to use image compression schemes different from each other for an image of each view according to each environment. In some cases, there may or may not exist additional information, which is transmitted in relation to an image of each view. In this case, display of a closed caption in each view of a multiview image should also be processed by a scheme different from each other according to additional information, which is transmitted in relation to an image of each view.

When a user watches a 3 dimensional image, it is profitable to display a closed caption within a depth range, which is seen as closer to the user compared to a 3D image in the vicinity of the closed caption, to more stably express the closed caption.

In order for a receiver to display the closed caption, it is necessary to have information related to the display of the closed caption. The information is called closed caption display information in the present invention. The closed caption display information can be determined by a manufacturer of the receiver in advance, can be designated by a user or can be designated as a guideline in relation to contents transmitted by a transmitting side. The closed caption display information can include a size of a window on which the closed caption is displayed, a position of a window, etc. In case of a multiview image, since the number of images is not small, it is able to further include display_window_view_id for identifying the time of applying the closed caption display information in addition to legacy caption information.

If a transmitter transmits all images for each view by encoding the images for a multiview 3 dimensional image (i.e., if a depth image is not separately transmitted), it is not necessary for a receiver to synthesize an image of a virtual view to provide the multiview 3 dimensional image. In this case, the receiver follows a scheme identical to a method of displaying a closed caption of a stereoscopic image (3 dimensional image) in each view. In particular, the receiver obtains information on a maximum and/or a minimum depth included in a 3 dimensional image in each view and can control the closed caption to be displayed in a manner of being closer to a user compared to a depth indicated by the 3 dimensional image of a corresponding view. Or, the receiver obtains information on a maximum and/or a minimum depth included in a 3 dimensional image in each view and can control the closed caption to be displayed in a manner of being farther from a user compared to a depth indicated by the 3 dimensional image of a corresponding view. If there is no depth image, a transmitting end transmits a disparity value to adjust a depth of a closed caption and a receiving end adjusts the depth of the closed caption on a window using the disparity value. To this end, the transmitting end defines a window (or closed caption display information) in a display_window_view_id view and identically designates a window disparity between adjacent views using the transmitted disparity. In particular, a disparity between closed captions included in each view can be identically applied by a disparity value of a closed caption included in the transmitted closed caption display information. In this case, the window can be used as a meaning indicating an area (e.g., an area of a rectangular) on which a closed caption is displayed.

For a multiview 3 dimensional image, if the transmitter transmits a part of images only among a plurality of images included in the multiview 3 dimensional image by encoding a part of the images and transmits a depth image related to a part of the images, the receiver can synthesize a 3 dimensional image in each view according to a procedure described in the following.

The receiver displays images in a manner of synthesizing an additional image as well as an inputted image using a depth image. If the receiver synthesizes a virtual image using the depth image and uses the virtual image to display a 3 dimensional image of each view, it is able to express images of many views with a small amount of data. In this case, the receiver can control a 3D effect of a closed caption using the transmitted depth image. A video compressing scheme including a depth image can include a camera parameter. The transmitter can compress a depth image using a camera parameter or transmits a camera parameter to the receiver irrespective of a depth image. The receiver can synthesize a virtual image in a manner of using a depth image to which information of a camera parameter is reflected or using a camera parameter, which is transmitted irrespective of a depth image, together with the depth image.

Referring to FIG. 10, images for a view 2, a view 4 and a view 6 among multiple views and a depth image 2, a depth image 4 and a depth image 6 for the corresponding views can be transmitted to the receiver. In this case, it is able to synthesize a view image 2.5, a view image 3, a view image 3.5, a view image 4.5, a view image 5 and a view image 5.5 using the view image 2, the view image 4, the view image 6, the depth image 2, the depth image 4 and the depth image 6. A disparity value included in a closed caption in each view can be included in the closed caption display information. The closed caption display information can respectively include a disparity value of a closed caption in each view. If a same disparity value is applied to a closed caption in all views, the closed caption display information can include a single disparity value for the closed caption. A procedure for the receiver to generate a virtual image for each view is explained in the following.

Figures 11, 12:
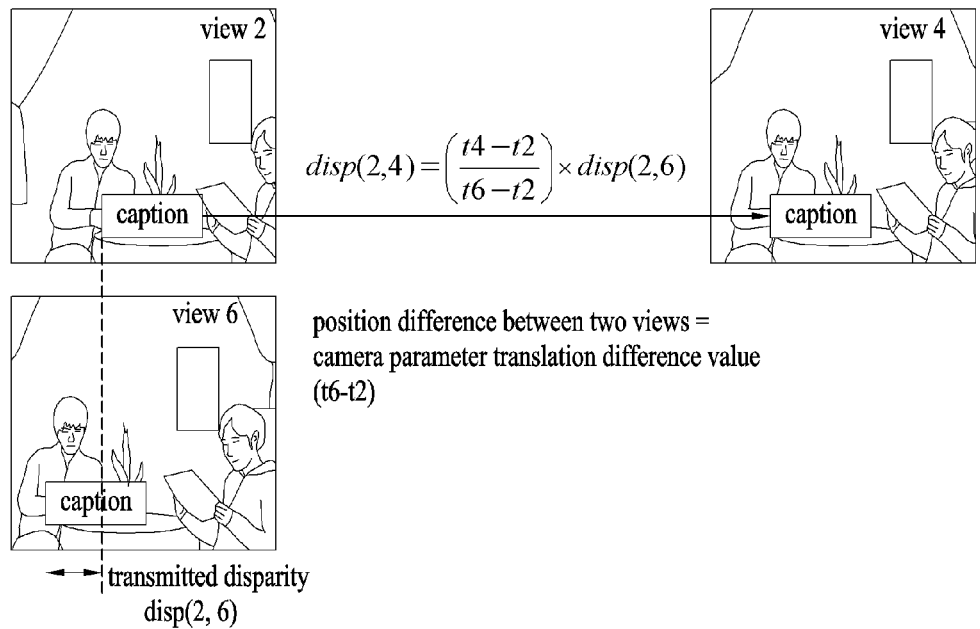
FIG. 11 is a diagram for a procedure of processing a closed caption in a multiview image in case of providing a disparity value of the closed caption according to one embodiment of the present invention.
FIG. 12 is a diagram for an equation of calculating a disparity according to one embodiment of the present invention.

FIG. 11 is a diagram for a procedure of processing a closed caption in a multiview image in case of providing a disparity value of the closed caption according to one embodiment of the present invention.

A receiver generates an image of a virtual view in accordance with display environment (number of views) using input images of each view transmitted from a transmitter and additional information according to the input images.

The transmitter can transmit caption information as well as the images of each view. In this case, the caption information can be called closed caption display information or stereoscopic 3D caption information. The closed caption display information includes information necessary for displaying a closed caption on the images of each view. The closed caption display information can include a size of a block (window) on which a caption is displayed, a position of a window and information for identifying a font in a window. In case of a 3 dimensional closed caption, in order to display perspective of a window, the closed caption display information can further include disparity information for identifying a disparity value of a window in each view and/or information for identifying the time of applying the closed caption display information.

The closed caption display information can be transmitted using a stereoscopic 3D caption information transmission scheme. The closed caption display information can be transmitted in a manner of being included in a broadcast signal as an element irrespective of an image data or can be transmitted in a manner of being included in service information (e.g., PSI/PSIP, DVB-SI) for legacy broadcast signaling. Or, the closed caption display information can be transmitted via an internet network irrespective of a broadcast signal. A closed caption can be separately transmitted irrespective of the closed caption display information or can be transmitted in a manner of being included in the closed caption display information.

The receiver displays a closed caption on an image of a view in a manner of overlaying the closed caption on the image and displays the closed caption on an image of a different view in a manner of horizontally moving the closed caption as much as a disparity value. For example, the receiver can display a transmitted closed caption on an image of a very left view in a manner of overlaying the closed caption on the image of the very left view.

As an example, the closed caption display information can include a disparity value between the very left view and the very right view. In general, since an image of the very left view and an image of the very right view correspond to actually inputted images, a disparity of a caption is configured in consideration of a disparity of an image itself and there is no problem in transmitting the disparity of the caption.

The receiver expresses a caption of the very left view on the very right view in a manner of horizontally moving the caption as much as a disparity of the transmitted caption. The receiver applies a disparity as much as a ratio of a horizontal movement value of a camera parameter to each of views between two views and then displays a caption on an image in a manner of horizontally moving the caption.

Referring to FIG. 11, an image of a second view corresponds to an image of the very left view and an image of a sixth view corresponds to an image of the very right view. The closed caption display information includes information for identifying a disparity between closed captions, which are included in the second view and the sixth view, respectively. The information can be represented as disp (2, 6). In this case, a position on which a closed caption is displayed in an image of a fourth view can be determined in consideration of a calculated disparity value. The disparity value can be calculated using camera parameters in the second view, the fourth view and the sixth view and information of disp (2, 6). An equation used for this calculation is shown in FIG. 11. In this case, t2, t4 and t6 can indicate a (virtual) position of a camera in the second, the fourth and the sixth view, respectively. Or, t2, t4 and t6 can indicate translation of a camera in the second, the fourth and the sixth view, respectively. In particular, for example, a value of (t6−t2) can indicate a position difference of a camera in the sixth view and the second view.

FIG. 12 is a diagram for an equation of calculating a disparity according to one embodiment of the present invention.

In case of transmitting a disparity of a multiview caption, a value of the disparity should be included in an appropriate range. It is visually preferable that a viewer feels a 3D effect of a closed caption is closer than surrounding of the closed caption. A 3D effect of a stereoscopic caption can also be configured in a manner of configuring a disparity to be big. Although information on the disparity of the multiview caption is transmitted, a disparity value of a view to which a disparity value of a closed caption is not provided can be calculated by a scheme described in the following.

A 3D effect of a closed caption can also be controlled using a scheme of configuring a disparity of the closed caption with a disparity bigger than a disparity of surrounding of a window on which the caption is displayed in multiview.

According to the present invention, a 3D image and a closed caption are synthesized with each other by calculating a position (depth) on which a window of the caption is displayed. In this case, a pixel of a biggest depth value is selected from pixels adjacent to a position of the window of the caption (pixels positioned near an edge of the window of the caption) and pixels of a position identical to the position of the window of the caption and it is able to convert the selected pixel into a disparity value applied to the window of the closed caption in each view.

It is able to calculate a disparity using a method of using a Depth to Disparity equation and a method of using 3D warping. A formula shown in FIG. 12 corresponds to a formula used by the method of using the Depth to Disparity equation.

Conversion using the Depth to Disparity equation can use a formula of 1-D Mode of VSRS3.5.

A receiver can convert a depth value of the selected pixel into a real depth of a 3 dimensional coordinate. In this case, Znear and Zfar correspond to items inputted together with an image. The receiver calculates Focal Length, Camera distance and point offset using an inputted or received camera parameter.

As a different method of calculating a disparity, it may use a conversion method using 3D warping. In this case, it may be able to use a method of General Mode of VSRS3.5.

The receiver performs 3D warping to each view using a camera parameter of an input view/target view and input color/depth view image. The receiver searches for a horizontal position difference (disparity) between a 3D warped point and an original point.

When a disparity for an image near a window of a caption is calculated using the aforementioned method, the receiver configures a disparity of the window of the caption to be equal to or greater than the calculated disparity. In particular, the receiver configures the disparity of the window of the caption to make the window of the caption to be displayed on a position closer to a viewer compared to the image near the window of the caption.

If a disparity (or a disparity for a window in which a closed caption is included) value of a closed caption between a very left view and a very right view of a multiview image is not transmitted or the disparity value is deviated from a depth range of the closed caption configured by the receiver, the receiver can configure a position on which the closed caption is to be displayed in each view using the aforementioned method. In particular, the receiver searches for a maximum depth pixel in the vicinity of the window including the closed caption between the very left view and the very right view in the multiview image, searches for a disparity value of the pixel using the aforementioned method and configures the disparity of the closed caption using a value greater than the disparity of the pixel.

Figure 13:
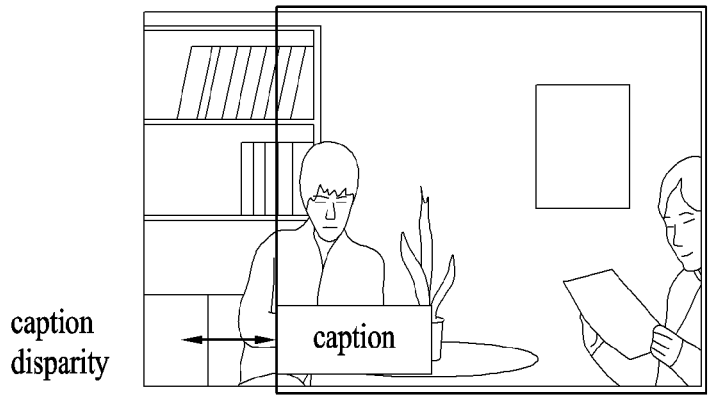
FIG. 13 is a diagram for a scheme of applying a calculated disparity to a closed caption according to one embodiment of the present invention.

FIG. 13 is a diagram for a scheme of applying a calculated disparity to a closed caption according to one embodiment of the present invention.

When a closed caption (or a window including the closed caption) is horizontally moved in an image of the very right view using a transmitted disparity value, a window area should not be deviated from a screen. Hence, it is necessary to set a limit on a disparity and a size and a position of an initial window to make the window not to be deviated from the screen.

When the receiver uses size information of a window, location information of the window and/or disparity information of the window including a closed caption included in closed caption display information, if the receiver arranges the closed caption to images of each view using the information as it is, a condition that the closed caption or a part of the window including the closed caption can be displayed at the outside of a screen may occur. In this case, the disparity value (or the disparity value of the window including the closed caption) of the closed caption can be adjusted using the aforementioned scheme or the position of the window or the size of the window can be adjusted. For example, if a closed caption displayed on an image of the very right view is configured as a reference closed caption, the receiver can control the position of the window to be positioned at the very left of the screen. Or, although the window horizontally moves as much as a disparity value, the receiver can control a width of the window to make the window not to be deviated from the screen in consideration of a disparity value between an image of the very right view and an image of the very left view. Or, the receiver can configure the closed caption to be displayed at the very left part of the window.

Figure 14:
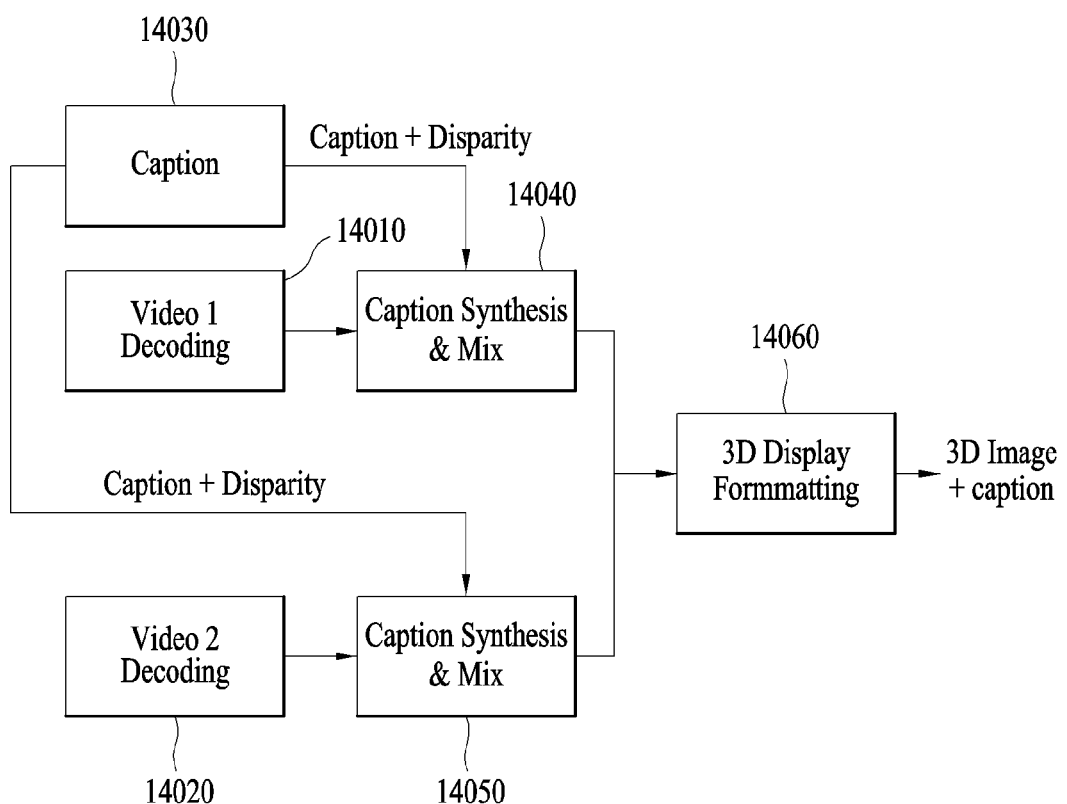
FIG. 14 is a diagram for a part of blocks of a multiview 3 dimensional image receiver according to a different embodiment of the present invention.

FIG. 14 is a diagram for a part of blocks of a multiview 3 dimensional image receiver according to a different embodiment of the present invention.

According to a different embodiment of the present invention, a multiview 3 dimensional image receiver can include a view 1 video image decoder 14010, a view 2 video image decoder 14020, a caption parser 14030, a first caption analysis unit and mixer 14040, a second caption analysis unit and mixer 14050 and/or a 3D display formatter 14060.

The view 1 video image decoder 14010 decodes a video image of a first view.

The view 2 video image decoder 14020 decodes a video image of a second view.

The caption parser 14030 parses closed caption data and/or closed caption display information delivered via a broadcast signal or an internet network.

The first caption analysis unit and mixer 14040 synthesize a video image of a first view and a closed caption. In this procedure, the first caption analysis unit and mixer 14040 can determine a position of the closed caption or a position of the window including the closed caption using information included in the closed caption display information.

The second caption analysis unit and mixer 14050 synthesize a video image of a second view and a closed caption. In this procedure, the second caption analysis unit and mixer 14050 can determine a position of the closed caption or a position of the window including the closed caption using information included in the closed caption display information. The first caption analysis unit and mixer 14040 and the second caption analysis unit and mixer 14050 can be implemented by a single device.

The 3D display formatter 14060 formats a video image of a first view including a closed caption and a video image of a second view to a 3D image. The 3D display formatter 14060 displays a 3D image and a 3D closed caption.

Figure 15:
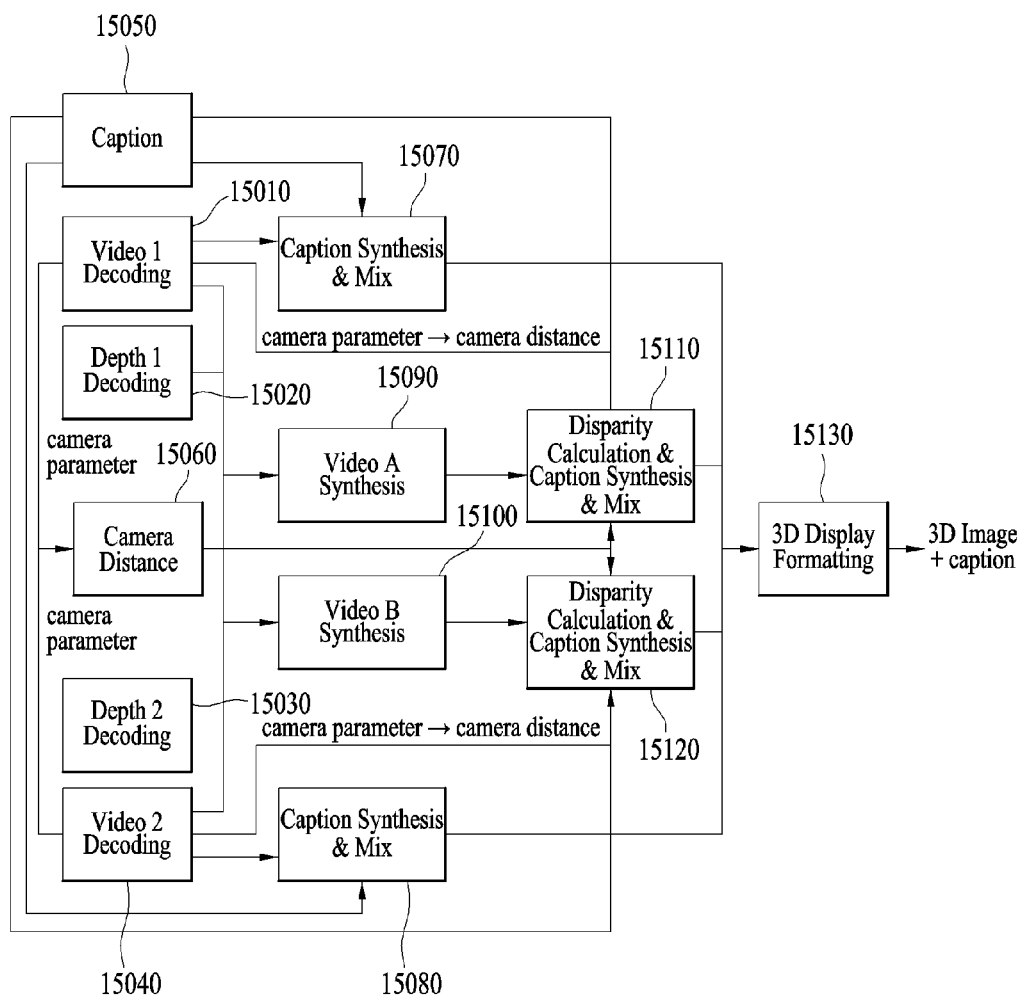
FIG. 15 is a diagram for a part of blocks of a multiview 3 dimensional image receiver according to a different embodiment of the present invention.

FIG. 15 is a diagram for a part of blocks of a multiview 3 dimensional image receiver according to a different embodiment of the present invention.

According to a different embodiment of the present invention, a multiview 3 dimensional image receiver can include a view 1 video image decoder 15010, a view 1 depth image decoder 15020, a view 2 depth image decoder 15030, a view 2 video image decoder 15040, a caption parser 15050, a camera parameter parser 15060, a first caption analysis unit and mixer 15070, a second caption analysis unit and mixer 15080, a view A video image analysis unit 15090, a view B video image analysis unit 15100, a first disparity calculation unit and a caption analysis unit and a mixer 15110, a second disparity calculation unit and a caption analysis unit and a mixer 15120, and/or a 3D display formatter 15130.

The view 1 video image decoder 15010 decodes a video image of a first view.

The view 1 depth image decoder 15020 decodes a depth image of a first view. The depth image can include a depth map and/or a camera parameter. The camera parameter can include information on a (virtual) position of a camera in each view.

The view 2 depth image decoder 15030 decodes a depth image of a second view. The depth image can include a depth map and/or a camera parameter. The camera parameter can include information on a (virtual) position of a camera in each view The view 2 video image decoder 15040 decodes a video image of a second view.

The caption parser 15050 parses a closed caption data and/or closed caption display information delivered via a broadcast signal or an internet network.

The camera parameter parser 15060 extracts a specific parameter from a camera parameter. For example, the camera parameter parser 15060 can extract information indicating a camera position from the camera parameter.

The first caption analysis unit and mixer 15070 synthesize a video image of a first view and a closed caption. In this procedure, the first caption analysis unit and mixer 15070 can determine a position of the closed caption or a position of the window including the closed caption using information included in the closed caption display information.

The second caption analysis unit and mixer 15080 synthesize a video image of a second view and a closed caption. In this procedure, the second caption analysis unit and mixer 15080 can determine a position of the closed caption or a position of the window including the closed caption using information included in the closed caption display information.

The view A video image analysis unit 15090 synthesizes a virtual image of a view A using received video images and/or depth images of each view.

The view B video image analysis unit 15100 synthesizes a virtual image of a view B using received video images and/or depth images of each view.

The first disparity calculation unit and a caption analysis unit and a mixer 15110 calculate a disparity value of a closed caption (or a window including the closed caption) in each view using (virtual) location information of a camera in each view included in a camera parameter. The first disparity calculation unit and a caption analysis unit and a mixer 15110 arrange a closed caption by applying the calculated disparity value to a virtual image of a specific view. A method of calculating a disparity of a closed caption (or a window including the closed caption) using a camera parameter is replaced with the explanation mentioned earlier in the foregoing description.

The second disparity calculation unit and a caption analysis unit and a mixer 15120 calculate a disparity value of a closed caption (or a window including the closed caption) in each view using (virtual) location information of a camera in each view included in a camera parameter. The second disparity calculation unit and a caption analysis unit and a mixer 15120 arrange a closed caption by applying the calculated disparity value to a virtual image of a specific view. A method of calculating a disparity of a closed caption (or a window including the closed caption) using a camera parameter is replaced with the explanation mentioned earlier in the foregoing description. The first disparity calculation unit and a caption analysis unit and a mixer 15110 and the second disparity calculation unit and a caption analysis unit and a mixer 15120 can be implemented by a single device.

The 3D display formatter 15130 formats a 3D video image using a video image of an actual view in which a closed caption is synthesized and a video image of a synthesized virtual view. The 3D display formatter 15130 displays a 3D image and a 3D closed caption included in the 3D image.

Figure 16:
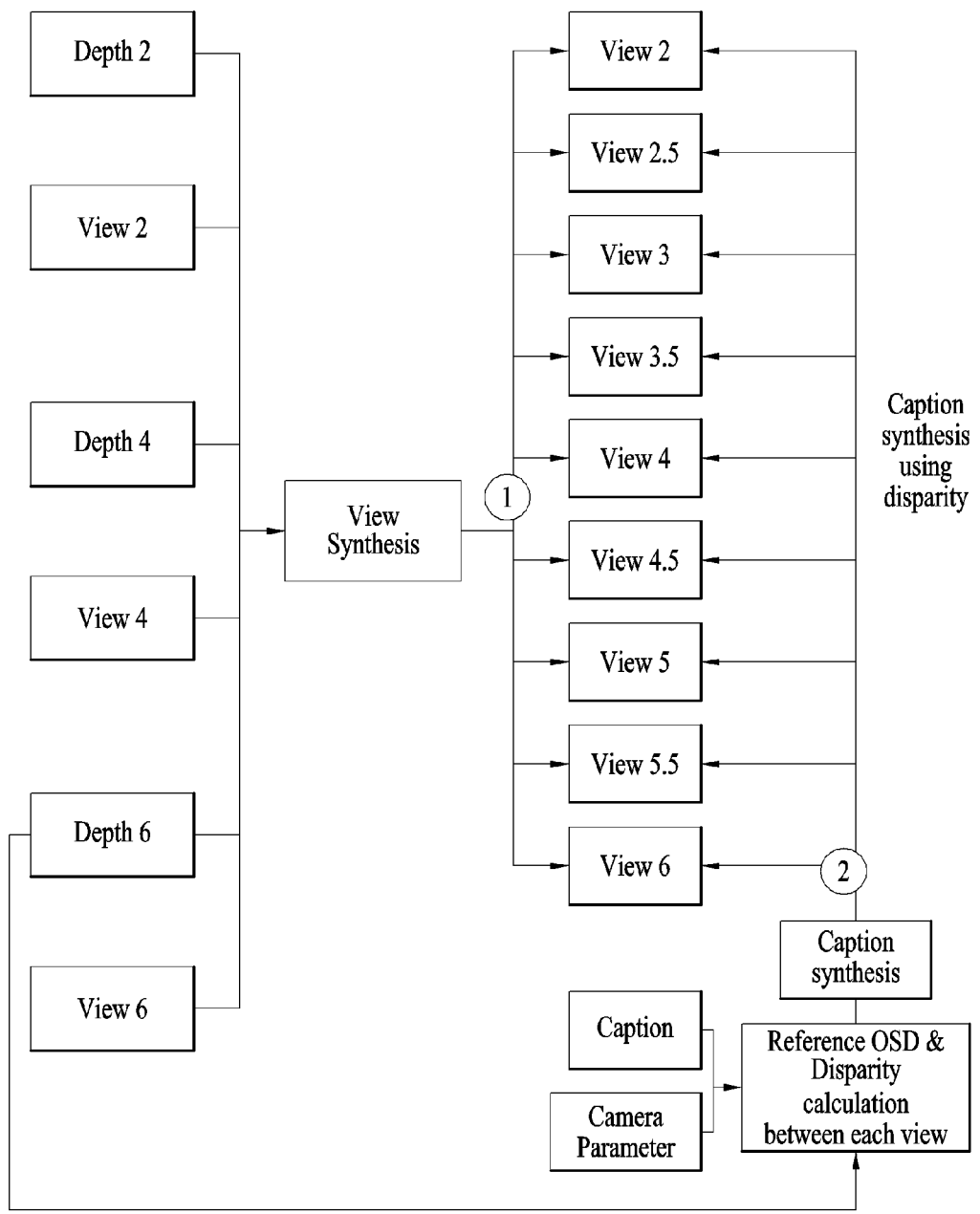
FIG. 16 is a diagram for a relationship of each image to display a closed caption on a multiview 3 dimensional image according to a different embodiment of the present invention.

FIG. 16 is a diagram for a relationship of each image to display a closed caption on a multiview 3 dimensional image according to a different embodiment of the present invention.

When a user watches a 3 dimensional image, it is profitable to display a closed caption within a depth range, which is seen as closer to the user compared to a 3D image in the vicinity of the closed caption, to more stably express the closed caption.

In order for a receiver to display the closed caption, it is necessary to have information related to the display of the closed caption. The information is called closed caption display information in the present invention. The closed caption display information can be determined by a manufacturer of the receiver in advance, can be designated by a user or can be designated as a guideline in relation to contents transmitted by a transmitting side. The closed caption display information can include a size of a window on which the closed caption is displayed, a position of a window, etc. In case of a multiview image, since the number of images is not small, it is able to further include display_window_view_id for identifying the time of applying the closed caption display information in addition to legacy caption information.

For a multiview 3 dimensional image, if a transmitter transmits a part of images only among a plurality of images capable of being included in the multiview 3 dimensional image in a manner of encoding a part of the images and transmits a depth image related to a part of the images, a receiver can synthesizes a 3 dimensional image in each view using a procedure described in the following.

The receiver displays images in a manner of synthesizing an additional image as well as an inputted image using a depth image. If the receiver synthesizes a virtual image using the depth image and uses the virtual image to display a 3 dimensional image of each view, it is able to express images of many views with a small amount of data. In this case, the receiver can control a 3D effect of a closed caption using the transmitted depth image. A video compressing scheme including a depth image can include a camera parameter. The transmitter can compress a depth image using a camera parameter or transmits a camera parameter to the receiver irrespective of a depth image. The receiver can synthesize a virtual image in a manner of using a depth image to which information of a camera parameter is reflected or using a camera parameter, which is transmitted irrespective of a depth image, together with the depth image, Unlike what is mentioned earlier in the foregoing description, FIG. 16 shows an image structure for synthesizing an image including a closed caption in each view in case that a disparity value of a closed caption (or a window including the closed caption) is not included in closed caption display information in a specific view.

Referring to FIG. 16, images for a view 2, a view 4 and a view 6 among multiple views and a depth image 2, a depth image 4 and a depth image 6 for the corresponding views can be transmitted to the receiver. In this case, it is able to synthesize a view image 2.5, a view image 3, a view image 3.5, a view image 4.5, a view image 5 and a view image 5.5 using the view image 2, the view image 4, the view image 6, the depth image 2, the depth image 4 and the depth image 6. In this case, if a reference image corresponds to the view image 6, the receiver generates a closed caption of the view 6 as a reference closed caption and may be then able to synthesize a closed caption of each view based on the reference closed caption. In a procedure of generating the reference closed caption, the receiver can use a depth image for a reference image and/or a camera parameter. In a procedure of determining a disparity value of the reference closed caption, the receiver can use a depth image, a depth map and/or a camera parameter. The receiver synthesizes an image including a closed caption in a manner of applying the determined disparity value to the closed caption (or a window including the closed caption) arranged to images of each view.

A procedure for the receiver to generate a virtual image for each view is described in the following.

Figure 17:
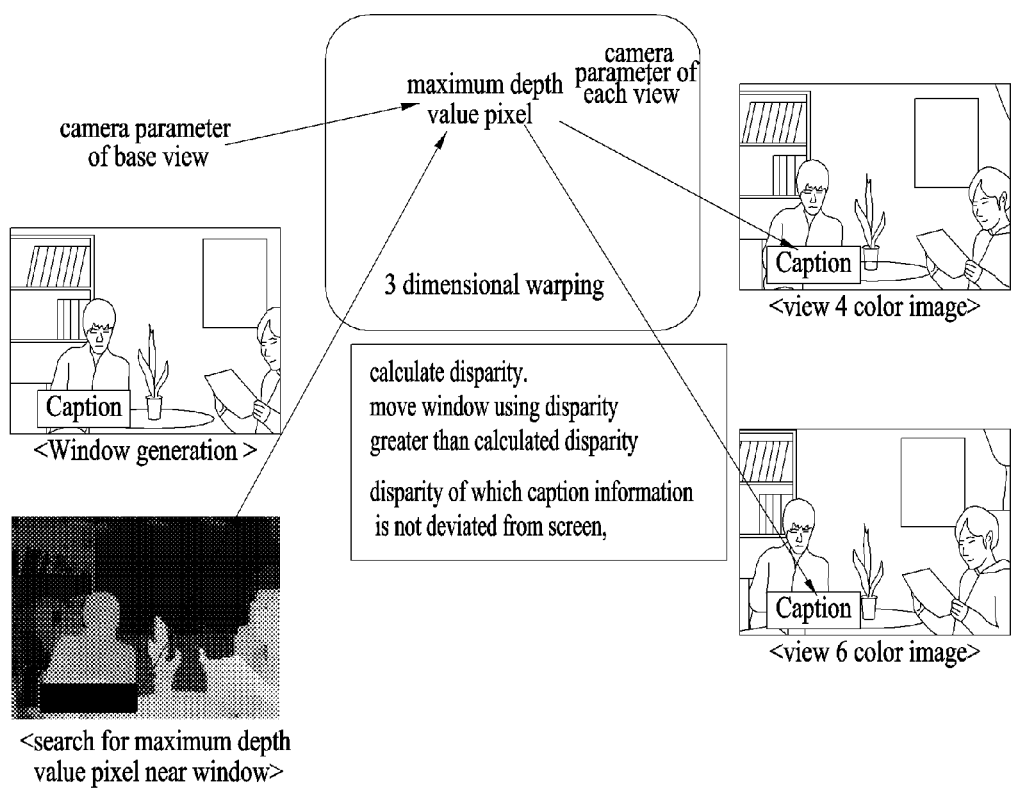
FIG. 17 is a diagram for a procedure of generating a multiview 3 dimensional image including a closed caption according to a different embodiment of the present invention.

FIG. 17 is a diagram for a procedure of generating a multiview 3 dimensional image including a closed caption according to a different embodiment of the present invention.

According to a different embodiment of the present invention, if a disparity value for a closed caption (or a window including the closed caption) is not provided, a receiver can directly calculate a disparity value for determining a position to which the closed caption should be arranged in each view.

First of all, a receiver generates a virtual view in accordance with display environment (number of views) using each input image and additional information according to the input image.

The receiver can arrange a closed caption on images of each view. For the arrangement of the closed caption, a transmitter can provide closed caption display information to the receiver. The closed caption display information can include a size of a block (window) on which the closed caption is displayed, a position of the window and/or font information in the window.

A transmitting end transmits closed caption data and/or the closed caption display information on the basis of a closed caption included in an image of a very left view. In case of synthesizing a closed caption in each virtual view, since the closed caption or the window may be deviated from a screen, the receiver controls the closed caption or the window to be positioned within a stable area.

Although the transmitting end does not transmit disparity information of multiview closed caption information, it is able to express a 3 dimensional closed caption in a manner that a receiving end configures a disparity of a closed caption or a disparity of a window including the closed caption using a depth map of an image.

The receiver displays a closed caption in an image of the very left view using information and data transmitted by the transmitting end.

The receiver can calculate a disparity of a closed caption (or a window) of each played view in a manner of configuring the very left view as a reference.

The receiver searches for a biggest depth pixel among pixels positioned near a closed caption or a window in which the closed caption is included within a reference view and calculates a disparity of a pixel for expressing a corresponding depth when a 3 dimensional image is generated using images of each view. In this case, a method of calculating a disparity value of a pixel is replaced with the explanation mentioned earlier in the foregoing description.

The receiver configures a disparity value to be applied to the closed caption or the window including the closed caption to be greater than the calculated disparity value of the pixel, horizontally moves the closed caption or the window as much as the disparity value of the closed caption and displays the closed caption or the window on an image of each view. Hence, when the receiver provides a 3 dimensional image using the image of each view, the closed caption can be displayed on a position closer to a viewer compared to a surrounding image.

Explanation on the aforementioned method of calculating a disparity of an OSD and the method of processing a position of the OSD can be identically applied to a method of calculating a disparity of a closed caption and a method of processing the closed caption (or the window including the closed caption) not to be positioned at the outside of a screen. In particular, in the aforementioned explanation on the OSD, a processing on the closed caption can be explained by assuming a case of using such a terminology as a closed caption (or a window including the closed caption) instead of an OSD.

Figure 18:
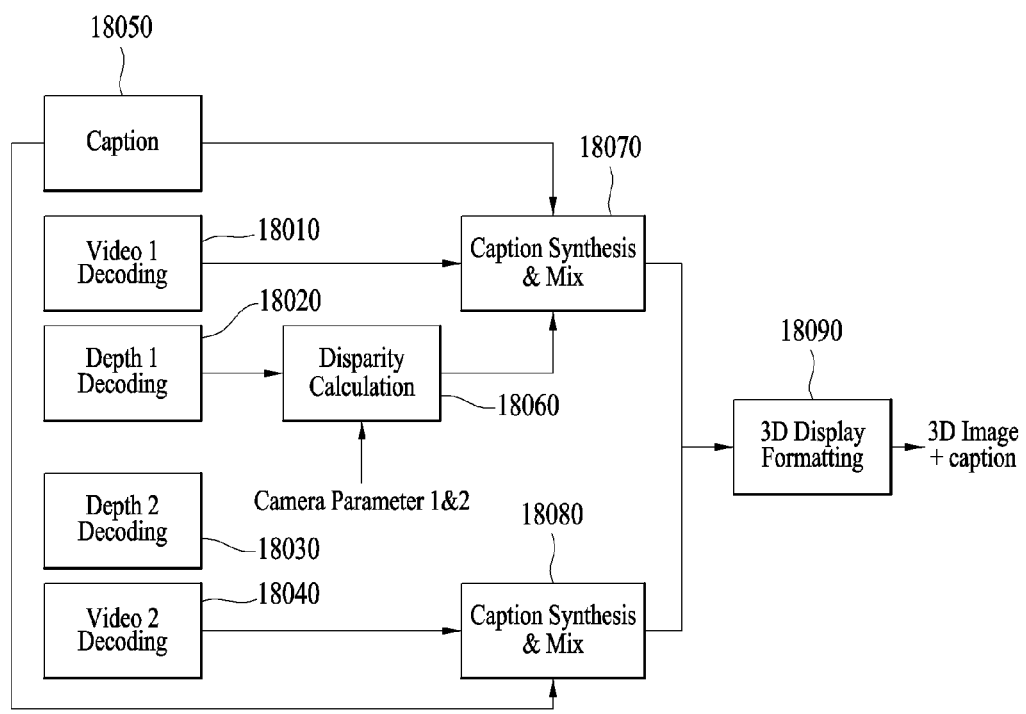
FIG. 18 is a diagram for a part of blocks of a multiview 3 dimensional image receiver according to a different embodiment of the present invention.

FIG. 18 is a diagram for a part of blocks of a multiview 3 dimensional image receiver according to a different embodiment of the present invention.

According to a different embodiment of the present invention, a multiview 3 dimensional image receiver can include a view 1 video image decoder 18010, a view 1 depth image decoder 18020, a view 2 depth image decoder 18030, a view 2 video image decoder 18040, a caption parser 18050, a disparity calculation unit 18060, a first caption analysis unit and mixer 18070, a second caption analysis unit and mixer 18080, and/or a 3D display formatter 15130.

The view 1 video image decoder 18010 decodes a video image of a first view.

The view 1 depth image decoder 18020 decodes a depth image of a first view. The depth image can include a depth map and/or a camera parameter. The camera parameter can include information on a (virtual) position of a camera in each view.

The view 2 depth image decoder 18030 decodes a depth image of a second view. The depth image can include a depth map and/or a camera parameter. The camera parameter can include information on a (virtual) position of a camera in each view The view 2 video image decoder 18040 decodes a video image of a second view.

The caption parser 18050 parses a closed caption data and/or closed caption display information delivered via a broadcast signal or an internet network.

The disparity calculation unit 18060 calculates a disparity of an image positioned near a closed caption (or a window) using a depth image including a depth map and/or a camera parameter. A method of calculating a disparity is replaced with the explanation mentioned earlier in the foregoing description.

The first caption analysis unit and mixer 18070 synthesize a video image of a first view and a closed caption. The first caption analysis unit and mixer 18070 configures a disparity of a closed caption (or a window including the closed caption) in consideration of a calculated disparity. The first caption analysis unit and mixer 18070 can determine a position of the closed caption in consideration of the configured disparity.

The second caption analysis unit and mixer 18080 synthesize a video image of a second view and a closed caption.

The second caption analysis unit and mixer 18080 configures a disparity of a closed caption (or a window including the closed caption) in consideration of a calculated disparity. The second caption analysis unit and mixer 18080 can determine a position of the closed caption in consideration of the configured disparity. The first caption analysis unit and mixer 18070 and the second caption analysis unit and mixer 18080 can be implemented by a single device.

The 3D display formatter 18090 formats a 3D video image using a video image of a first view including a closed caption and a video image of a second view. The 3D display formatter 18090 displays a 3D image and a 3D closed caption.

Figure 19:
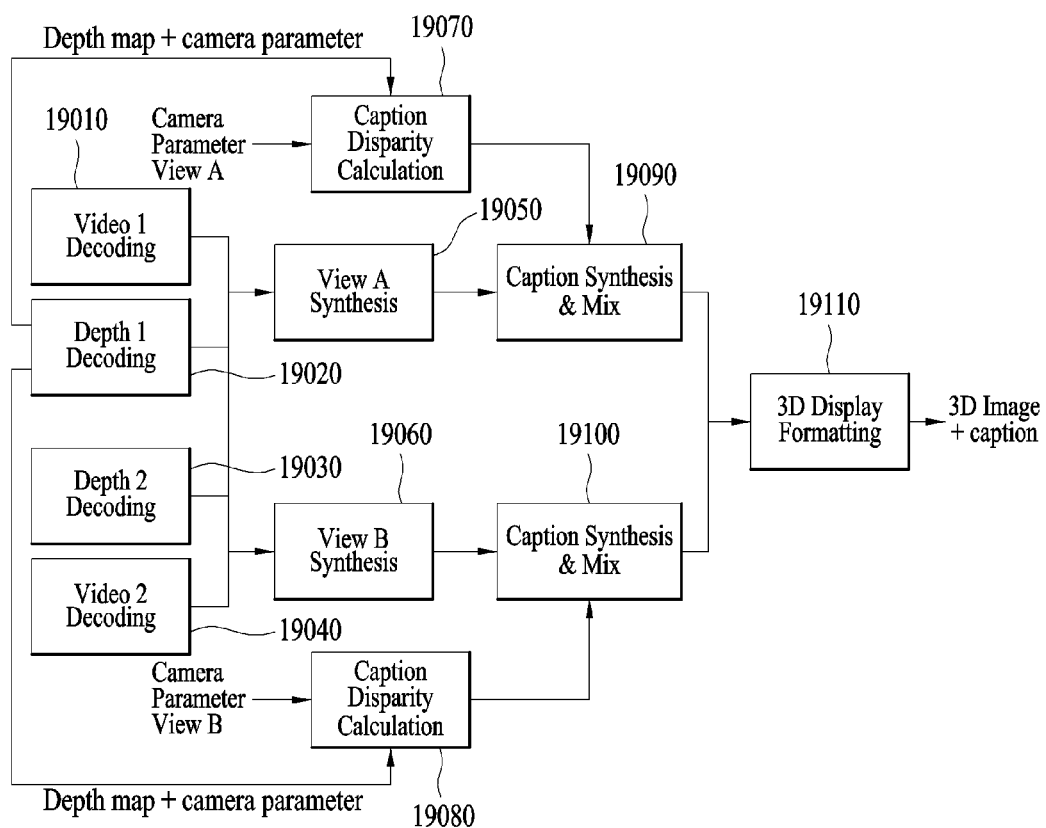
FIG. 19 is a diagram for a part of blocks of a multiview 3 dimensional image receiver according to a different embodiment of the present invention.

FIG. 19 is a diagram for a part of blocks of a multiview 3 dimensional image receiver according to a different embodiment of the present invention.

According to a different embodiment of the present invention, a multiview 3 dimensional image receiver can include a view 1 video image decoder 19010, a view 1 depth image decoder 19020, a view 2 depth image decoder 19030, a view 2 video image decoder 19040, a view A video image analysis unit 19050, a view B video image analysis unit 19060, a first caption disparity calculation unit 19070, a second caption disparity calculation unit 19080, a first caption analysis unit and mixer 19090, a second caption analysis unit and mixer 19100, and/or a 3D display formatter 15130.

A part of blocks of the multiview 3 dimensional image receiver shown in FIG. 19 can be used in a manner of being combined with a part of blocks of the aforementioned multiview 3 dimensional image receiver. In particular, the block mentioned earlier in FIG. 18 performs processing of a closed caption for an image of a view providing an actual image and the block shown in FIG. 19 performs processing of a closed caption for an image of a virtual view.

The view 1 video image decoder 19010 decodes a video image of a first view.

The view 1 depth image decoder 19020 decodes a depth image of a first view. The depth image can include a depth map and/or a camera parameter. The camera parameter can include information on a (virtual) position of a camera in each view.

The view 2 depth image decoder 19030 decodes a depth image of a second view. The depth image can include a depth map and/or a camera parameter. The camera parameter can include information on a (virtual) position of a camera in each view.

The view 2 video image decoder 19040 decodes a video image of a second view.

The view A video image analysis unit 19050 synthesizes a video image of a view A using a video image of an actually provided view and a depth image (e.g., a video image of a first view, a video image of a second view and a depth image).

The view A video image analysis unit 19060 synthesizes a video image of a view B using a video image of an actually provided view and a depth image (e.g., a video image of a first view, a video image of a second view and a depth image).

The first caption disparity calculation unit 19070 calculates a disparity of an image near a closed caption (or a window) using a depth image including a depth map and/or a camera parameter. A method of calculating a disparity is replaced with the explanation mentioned earlier in the foregoing description. The first caption disparity calculation unit 19070 can configure a disparity applied to a closed caption (or a window including the closed caption) in consideration of a calculated disparity. The first caption disparity calculation unit 19070 can use a camera parameter for a view A in case of calculating or configuring a disparity. The first caption disparity calculation unit 19070 can calculate or configure a disparity of a closed caption (or a window including the closed caption) using an equation of the aforementioned method with information indicating a position of a virtual camera of a view A.

The second caption disparity calculation unit 19080 calculates a disparity of an image near a closed caption (or a window) using a depth image including a depth map and/or a camera parameter. A method of calculating a disparity is replaced with the explanation mentioned earlier in the foregoing description. The second caption disparity calculation unit 19080 can configure a disparity applied to a closed caption (or a window including the closed caption) in consideration of a calculated disparity. The second caption disparity calculation unit 19080 can use a camera parameter for a view B in case of calculating or configuring a disparity. The second caption disparity calculation unit 19080 can calculate or configure a disparity of a closed caption (or a window including the closed caption) using an equation of the aforementioned method with information indicating a position of a virtual camera of a view B. The first caption disparity calculation unit 19070 and the second caption disparity calculation unit 19080 can be implemented by a single device.

The first caption analysis unit and mixer 19090 synthesize a video image of a view A and a closed caption. The first caption analysis unit and mixer 19090 can determine a position of the closed caption in consideration of a configured disparity.

The first caption analysis unit and mixer 19100 synthesize a video image of a view B and a closed caption. The first caption analysis unit and mixer 19100 can determine a position of the closed caption in consideration of a configured disparity.

The 3D display formatter 19110 formats a 3D video image using a video image of a view A including a closed caption and a video image of a view B. The 3D display formatter 19110 displays a 3D image and a 3D closed caption.

According to the present invention, it is able to display an OSD or a closed caption on an appropriate position of an image of each view in environment providing a multiview 3 dimensional image.

According to the present invention, it is able to prevent a part of an OSD or a part of a closed caption from being cut and displayed in a manner of configuring the OSD or the closed caption to be positioned at the outside of a screen in an image of each view in environment providing a multiview 3 dimensional image.

According to the present invention, it is able to make interruption between a plurality of an OSD and a closed caption not to be occurred when a plurality of the OSD and the closed caption are displayed in environment providing a multiview 3 dimensional image.

All method inventions according to the present invention are implemented in a form of program commands capable of being performed through various computer means and recorded in a medium readable by a computer.

The medium readable by a computer can include a program command, a data file, a data structure and the like individually or a combination thereof. The program commands recorded in the medium can be specially designed for the present invention or may be usable in a manner of being notified to those skilled in computer software. Examples of the recording medium readable by a computer include a magnetic media such as a hard disk, a floppy disk and a magnetic tape, an optical media such as a CD-ROM and a DVD, a magneto-optical media such as a floptical disk and such a hardware device specifically configured to store and perform a program command as a ROM, a RAM, a flash memory and the like. Examples of the program command include not only a machine code compiled by a compiler but also a high level language code capable of being executed using an interpreter and the like. The aforementioned hardware device can be configured to operate as one or more software modules to perform operations of the present invention and vice versa.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

MODE FOR INVENTION

As mentioned in the foregoing description, the related is described in the best mode for invention.

INDUSTRIAL APPLICABILITY

The present invention is usable throughout a broadcasting industry.

What is claimed is:

1. A method of processing a 3-dimensional (3D) image containing an additional object in a system providing a multiview image, the method comprising:
   receiving video images and depth images for a plurality of views;
   configuring an additional object among additional objects displayed on the video images for a plurality of the views as a reference additional object;
   calculating a disparity of a pixel of a video image adjacent to an area on which the reference additional object and an edge of the reference additional object;
   synthesizing the reference additional object with a video image of a first view and a video image of a second view in a manner of applying a disparity value equal to or greater than the calculated disparity value to the reference additional object; and
   formatting the video image of the first view and the video image of the second view with which the reference additional object is synthesized as a 3D image,
   wherein the configuring the additional object comprises:
      comparing a first distance between a first additional object which is displayed on a leftmost video image among the video images for the plurality of the views and a left edge of a screen, and a second distance between a second additional object which is displayed on a rightmost video image among the video images for the plurality of the views and a left edge of a screen; and
      configuring one of the first additional object and the second additional object as the reference additional object.

2. The method of claim 1, wherein the step of calculating the disparity of the pixel of the video image comprises:
   identifying a pixel indicating a biggest depth among pixels adjacent to the area on which the reference additional object is displayed and an edge of the reference additional object; and
   calculating a disparity of the identified pixel.

3. The method of claim 1, wherein each of the depth images comprises at least one of a depth map and a camera parameter.

4. The method of claim 1, wherein the additional object corresponds to an on the screen (OSD) or a closed caption.

5. The method of claim 1, further comprising synthesizing a second reference additional object with the video image of the first view and the video image of the second view with which the reference additional object is synthesized.

6. The method of claim 5, wherein the synthesizing the second reference additional object comprises;
   generating information for identifying a difference of a depth between the reference additional object and the second reference additional object; and
   synthesizing the second reference additional object with the video image of the first view and the video image of the second view by applying a disparity indicating the difference of the depth indicated by the generated information.

7. A receiver configured to process a 3-dimensional (3D) image containing an additional object in a system providing a multiview image, the receiver comprising:
   a decoder configured to decode video images and depth images for a plurality of views;
   a disparity calculation unit configured to configure an additional object among additional objects displayed on the video images for a plurality of the views as a reference additional object and configured to calculate a disparity of a pixel of a video image adjacent to an area on which the reference additional object and an edge of the reference additional object;
   an additional object synthesizing unit configured to synthesize the reference additional object with a video image of a first view and a video image of a second view in a manner of applying a disparity value equal to or greater than the calculated disparity value to the reference additional object; and
   a 3D display formatter configured to format the video image of the first view and the video image of the second view with which the reference additional object is synthesized as a 3D image,
   wherein the disparity calculation unit is further configured to:
      compare a first distance between a first additional object which is displayed on a leftmost video image among the video images for the plurality of the views and a left edge of a screen, and a second distance between a second additional object which is displayed on a rightmost video image among the video images for the plurality of the views and a left edge of a screen, and
      configure one of the first additional object and the second additional object as the reference additional object.

8. The receiver of claim 7, wherein the disparity calculation unit is further configured to identify a pixel indicating a biggest depth among pixels adjacent to the area on which the reference additional object is displayed and an edge of the reference additional object and configured to calculate a disparity of the identified pixel.

9. The receiver of claim 7, wherein each of the depth images comprises at least one of a depth map and a camera parameter.

10. The receiver of claim 7, wherein the additional object corresponds to an on screen display (OSD) or a closed caption.

11. The receiver of claim 7, wherein the additional object synthesizing unit is further configured to synthesize a second reference additional object with the video image of the first view and the video image of the second view with which the reference additional object is synthesized.

12. The receiver of claim 11, wherein the disparity calculation unit is further configured to generate information for identifying a difference of a depth between the reference additional object and the second reference additional object and configured to synthesize the second reference additional object with the video image of the first view and the video image of the second view by applying a disparity indicating the difference of the depth indicated by the generated information.

* * * * *